(12) United States Patent
Kai et al.

(10) Patent No.: US 9,252,589 B2
(45) Date of Patent: Feb. 2, 2016

(54) TRANSFORMER INRUSH CURRENT RESTRAINING CONTROL EQUIPMENT

(71) Applicant: Kodensya Co., Ltd., Miyazaki (JP)

(72) Inventors: Toshiyasu Kai, Miyazaki (JP); Yoshihide Hase, Kanagawa (JP)

(73) Assignee: Kodensya Co., Ltd., Miyazaki (JP)

( * ) Notice: Subject to any disclaimer, the term of this patent is extended or adjusted under 35 U.S.C. 154(b) by 543 days.

(21) Appl. No.: 13/760,704

(22) Filed: Feb. 6, 2013

(65) Prior Publication Data

US 2013/0208386 A1 Aug. 15, 2013

Related U.S. Application Data

(63) Continuation of application No. PCT/JP2012/067585, filed on Jul. 10, 2012.

(30) Foreign Application Priority Data

Dec. 7, 2011 (JP) .................................. 2011-267543

(51) Int. Cl.
| | |
|---|---|
| *H02H 3/26* | (2006.01) |
| *H02H 7/04* | (2006.01) |
| *H02H 7/045* | (2006.01) |
| *H02H 9/00* | (2006.01) |
| *H01H 9/56* | (2006.01) |

(52) U.S. Cl.
CPC .............. *H02H 7/04* (2013.01); *H02H 7/0455* (2013.01); *H02H 9/002* (2013.01); *H01H 9/563* (2013.01)

(58) Field of Classification Search
USPC .......................................................... 361/76
See application file for complete search history.

(56) References Cited

U.S. PATENT DOCUMENTS

| | | | | |
|---|---|---|---|---|
| 2004/0124814 | A1* | 7/2004 | Tsutada .................... | G05F 1/12 323/247 |
| 2010/0039737 | A1* | 2/2010 | Koshizuka ............. | H02H 9/002 361/36 |
| 2010/0141235 | A1* | 6/2010 | Koshiduka ............. | H02H 9/002 323/355 |
| 2011/0204870 | A1* | 8/2011 | Tsutada ............... | H01H 33/593 323/355 |
| 2012/0293896 | A1* | 11/2012 | Mori ...................... | H02H 9/002 361/35 |
| 2013/0208386 | A1* | 8/2013 | Kai .......................... | H02H 7/04 361/115 |

FOREIGN PATENT DOCUMENTS

| | | |
|---|---|---|
| JP | 1980-100034 A | 7/1980 |
| JP | 2008-140580 A | 6/2008 |
| JP | 2008-160100 A | 7/2008 |
| JP | 2011-154974 A | 8/2011 |
| JP | 2012-028616 A | 2/2012 |

\* cited by examiner

*Primary Examiner* — Ronald W Leja
(74) *Attorney, Agent, or Firm* — Dingman, McInnes & McLane, LLP (57) ABSTRACT

There is provided with a transformer inrush current restraining control equipment that provide useful practice to effectively restrain transformer inrush current which would be inevitably caused whenever a transformer under out of service is going to be put into operation by the related breaker closing operation. The transformer inrush current restraining control equipment 10 includes a voltage measuring unit 1; a true residual fluxes timing calculating unit 2; a core-flux calculating unit 3; a true residual flux calculating unit 4; a breaker closing phase angular timing calculating unit 5; a breaker closing phase angular timing controlling unit 6.

7 Claims, 7 Drawing Sheets

In Case of Supplying Power With Same Phase Angle   In Case of Supplying Power With Anti-Phase Angle

Fig. 4A
Vector Triangle of True Residual Flux

Fig. 7

# TRANSFORMER INRUSH CURRENT RESTRAINING CONTROL EQUIPMENT

RELATED APPLICATIONS

This patent application is a continuation of International Application No. PCT/JP2012/067585, filed on Jul. 10, 2012, entitled, "Magnetizing Inrush Current Suppression Device," which claims priority to Japanese Patent Application No. 2011-267543, filed on Dec. 7, 2011, the contents and teachings of each of which are hereby incorporated by reference in their entirety.

FIELD

The present innovation relates to a transformer inrush current restraining control equipment that controls closing phase angular timing of a breaker (hereinafter referred to as the "system source-side breaker") which is connected between a three-phase transformer and a power system source-side (hereinafter referred to as the "system source-side"), so that the transformer inrush current which is caused just after the source-side breaker is closed can be effectively restrained.

BACKGROUND

It is known that excessive transformer inrush current would be caused whenever a transformer is going to be energized by the power system source-side breaker closing, and various bad effects such as temporary voltage drop, three-phase current unbalance as well as severe current waveform distortion would be caused on the adjacent power loads.

It is also known that the transformer inrush current is caused as a phenomena closely related with the transformer residual fluxes that appear in the transformer three-phase steel cores whenever it is tripped by the related breaker, and the initial energizing fluxes caused when the transformer is again energized in the next chance. So, quite accurate estimation or calculation of the caused residual fluxes in the transformer is essential in order to effectively restrain the energizing inrush current.

In this respect, there has been made often an easy explanation about the residual flux of a three-phase transformer, that is for example, residual fluxes appears whenever a three phase transformer under no load condition is cutoff from the power source-side by a connected breaker tripping, and the magnitudes of the residual fluxes appearing in the three phase transformer cores are the fluxes values just at the instant timing of the transformer cutoff by the related breaker tripping operation. By the way, no-load condition of the transformer means the condition where the high voltage side breaker is closed and the low voltage side (load side) breaker is opened so that power is not supplied to the load through this transformer.

Or for example, a conventional transformer inrush current control equipment is provided with a voltage memorizing unit to memorize the three phase voltage values just at the instant of the breaker tripping, and when the transformer is energized by the breaker closing, the breaker closing timing is controlled so that the three-phase voltage phase angles at the instant of the breaker closing become coincident with that of the memorized three phase voltage angular timing (see for example Japanese Patent Provisional Publication No. S55-100034).

Another example of conventional transformer inrush current restraining control equipment is provided with a voltage measuring unit to measure three-phase voltages of the transformer terminals and that of power source-side, the transformer core residual fluxes calculating unit which calculate the fluxes by the transformer three-phase voltages integration and to memorize the fluxes values and the polarities just at the angular timing of the breaker tripping as so to speak residual fluxes, and further the breaker closing phase angular timing controlling unit to restrain the inrush current.

The breaker closing phase angular timing controlling unit control the breaker closing angular timing so as to meet within the time interval where the polarities of the three phase initial energized fluxes energized by a system source-side voltages at the breaker closing timing and the polarities of the memorized residual fluxes become coincident in each phase (see for example Japanese Patent Provisional Publication No. 2008-140580).

SUMMARY

However, these conventional transformer inrush current restraining control equipment are utilized with the breaker closing timing control functions based on the doubtful idea that the transformer three-phase residual fluxes are the fluxes values just at the instant of the breaker tripping completion, that is the timing of the breaker arc-current extinction.

The inventors of the present innovation have proved by their own model circuit experimental test results and revealed the real concept of the transient phenomenon of the residual fluxes theoretically and experimentally, that is caused just after the three-phase transformer disconnection by the breaker tripping and the fluxes in the cores of the transformer converge on a certain values at a little late timing after the transient behavior. The transient phenomenon of the fluxes as well as the voltages and the current are caused on the transformer low voltage-winding side circuit where small load such as surge absorber unit and stray capacitances and leakage inductances of the connected wires and/or cables are connected, and transient phenomenon continue comparable long time duration.

More specifically, the conventional transformer inrush current restraining control equipment as well as the conventional transformer protective control equipment utilizes mostly the theory without clear recognition that the residual fluxes of the transformers are not the fluxes values just at the instant timing of the transformer energized current tripping by the breaker tripping action but the values just after the following transient behavior. Such conventional equipment can not restrain the caused inrush current effectively when transformer is energized by the breaker closing action, because they are utilized with the theory based on the false recognition of the residual fluxes that are different from the true concept of the residual fluxes that would be caused in the transformer cores.

An object of the present innovation, which has been made in order to solve the above-mentioned defects is to provide a transformer inrush current restraining control equipment in that true technical concept of the caused residual fluxes, in stead of the false concept of the residual fluxes, is introduced as the basis of the equipment, and only by that effective inrush current restraining control can be performed.

An transformer inrush current restraining control equipment according to the present innovation is comprised with a voltage measuring unit that measures three phase voltages of the power system source-side of a three-phase transformer; a true residual fluxes timing calculating unit that calculate the timing when all the three-phase voltage transient phenomenon disappear that are caused just after the transformer is disconnected by the breaker tripping and further the three-phase voltage values converge on a zero values simultaneously that are measured by the voltage measuring unit; a core-flux calculating unit that calculate fluxes values in the three-phase transformer cores by integration of the three-phase voltages which have been measured by the voltage measuring unit; a true residual flux calculating unit that calculate the fluxes values in the three-phase cores of the transformer just at the instant of the true residual fluxes timing and memorize them as the true residual fluxes that have been calculated by the core-flux calculating unit; a breaker closing phase angle calculating unit that calculate the appropriate phase angular timing of the breaker closing operation by utilizing the calculated true residual fluxes values; a breaker 21 closing phase angle controlling unit that control the phase angular timing of the breaker closing by utilizing the three phase voltages that are measured by the voltage measuring unit, and the breaker closing phase angular timing that have been calculated by the breaker closing phase angular calculating unit.

The transformer inrush current restraining control equipment according to the present innovation can realize the accurate calculation of the residual fluxes in the three-phase transformer cores, and it can realize effective transformer inrush current restraining control.

DETAILED DESCRIPTION

First Embodiment

For description of the transformer inrush current restraining control equipment 10 according to this embodiment of the present innovation, the residual fluxes are explained with reference to FIGS. 1 and 2, that are inevitably caused in the cores of an three-phase transformer (hereinafter referred to as the "transformer 23") whenever the operating transformer with no load condition (that is, a load-side breaker 22 is with opened-position and the power system source-side breaker 21 is with closed-position) is tripped by the breaker 21 tripping operation.

In the hereunder description, the suffixes "a", "b" and "c" of notes for voltages "v", currents "i" and fluxes "φ" are used to indicate the individual values of phase "a", phase "b" and phase "c" quantities, respectively.

When the transformer 23 is going to be disconnected from the power system source-side, the load-side breaker 22 on the secondary side (a low-voltage side, a load side) of the transformer 23 is tripped first and the transformer 23 becomes the no-load condition with small energizing current flowing.

In this stage (state of no-load excitation), the primary windings (the high voltage side coils) of the transformer 23 are still charged with the power system source-side primary voltages ($V_{Ha}(t)$, $V_{Hb}(t)$, $V_{Hc}(t)$) and the primary currents ($i_{Ha}(t)$, $i_{Hb}(t)$, $i_{Hc}(t)$) are flowing through the primary windings. And the secondary windings (the low voltage side coils) of the transformer 23 are also still charged as the secondary voltages ($V_{La}(t)$, $V_{Lb}(t)$, $V_{Lc}(t)$) however the secondary load currents ($i_{Ha}(t)$, $i_{Hb}(t)$, $i_{Hc}(t)$) are not flowing through the secondary windings.

In addition, fluxes (($\phi_a(t)$, ($\phi_b(t)$, $\phi_c(t)$) exist in the cores of the transformer 23.

Here, the relation of the power system source-side voltages ($V_a(t)$, $V_b(t)$, $V_c(t)$), or the primary voltages or the secondary voltages of the transformer 23 and the fluxes ($\phi_a(t)$, $\phi_b(t)$, $\phi_c(t)$) in the cores of the transformer 23 can be explained by the equations (1) hereunder described and they are satisfied regardless under steady state conditions or transient state conditions:

Equation 1

$$\phi_a(t) = \int V_a(t)dt$$

$$\phi_b(t) = \int V_b(t)dt$$

$$\phi_c = \int V_c(t)dt \quad \text{Set of Equations (1)}$$

The system voltages ($V_a(t)$, $V_b(t)$, $V_c$), and the primary voltages as well as the secondary voltages of the transformer 23 under no-load normal condition can be expressed by the set of the equations (2), so that the fluxes in the transformer cores under the no-load condition are written by the Set of the equation (3) that are derived from the Sets of Equations (1) and (2):

Equation 2

$$V_a(t) = V\cos(t)$$

$$V_b(t) = V\cos(t - 2\pi/3)$$

$$V_c(t) = V\cos(t + 2\pi/3) \quad \text{Set of Equations (2)}$$

Equation 3

$$\phi_a(t) = \Phi\cos(t - \pi/2) = \Phi\sin(t)$$

$$\phi_b(t) = \Phi\cos(t - 2\pi/3 - \pi/2) = \Phi\sin(t - 2\pi/3)$$

$$\phi_c(t) = \Phi\cos(t + 2\pi/3 - \pi/2) = \Phi\sin(t + 2\pi/3) \quad \text{Set of Equations (3)}$$

The fluxes in the cores of the three phase transformer 23 are of three phase balanced sinusoidal waveforms under steady state condition and they are 90 degrees shifted in comparison with the three phase balanced sinusoidal waveforms of the respective same phase voltages. Then for example, the waveforms of the fluxes ($\phi_a(t)$, $\phi_b(t)$, $\phi_c(t)$) as is shown in the lower section of FIG. 2(a) can be obtained from the waveforms of the secondary voltages ($V_{La}(t)$, $V_{Lb}(t)$, $V_{Lc}(t)$) as is shown in the upper section of FIG. 2(a).

By the way, the three phase voltage waveforms of the primary windings of the transformer 23 and that of the secondary windings of the transformer 23 can be directly measured through the instrument transformer (Voltage Transformer: VT). However, the waveforms of the fluxes ($\phi_a(t)$, $\phi_b(t)$, $\phi_c(t)$) in the cores of the transformer 23 can not be directly measured so that they are generated as the calculated integrated values of the of the measured voltages.

Figure 2A:
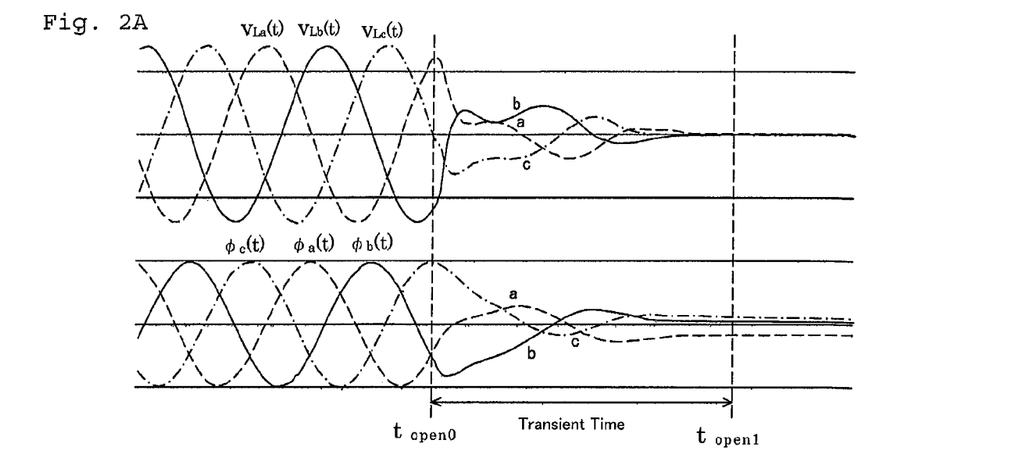
FIG. 2(a) shows three-phase voltages waveforms of the transformer just before and immediately after the transformer disconnected timing by the breaker tripping by that the no-load operated transformer is disconnected from the power system source-side, and the three-phase fluxes waveforms in the transformer cores that are derived as the calculated values of time integration of the above-mentioned three-phase voltages.
Figure 2B:
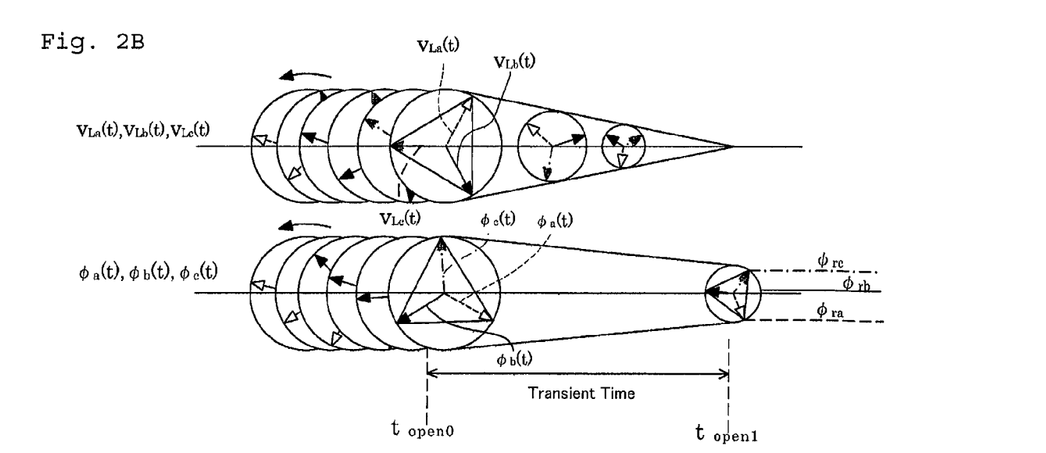
FIG. 2(b) shows vectors diagrams of the above described three-phase voltages waveforms and the three-phase fluxes waveforms in the time duration of just before and after the transformer cutoff.

In FIG. 2(a) and FIG. 2(b), the time "$t_{open0}$" is the instantaneous timing when the power system source-side breaker 21 is tripped and the transformer three-phase small energizing currents are cutoff just after the moving contact is separated from the fixed contact as the operating process of disconnecting the transformer 23 from the power system source-side under no-load condition (the time "$t_{open0}$" is hereunder described as the tripping time $t_{open0}$).

Figure 1:
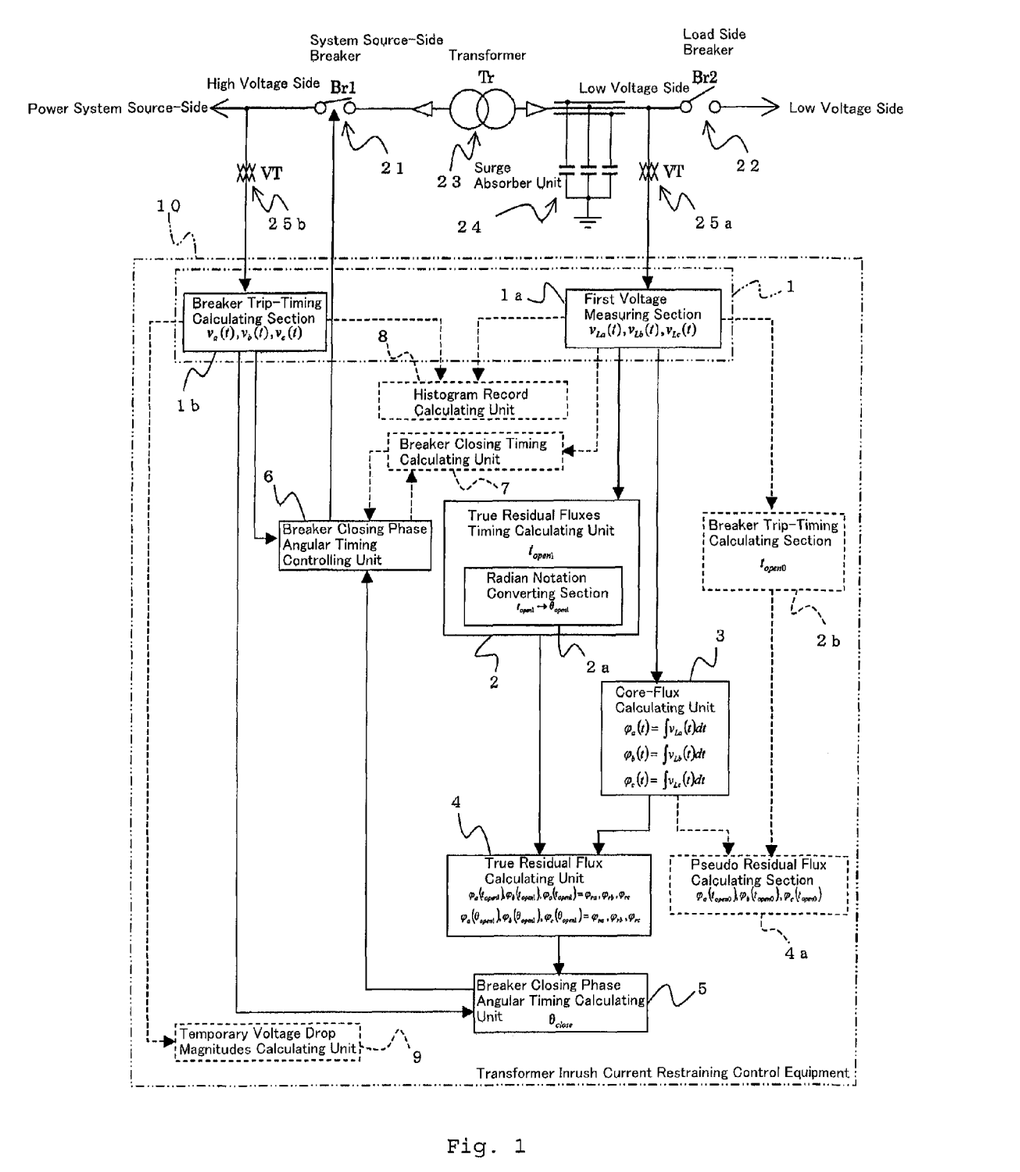
FIG. 1 shows a schematic configuration diagram of the transformer inrush current restraining control equipment according to the first embodiment of the present innovation, that indicate the connecting relationship between a transformer and the transformer inrush current restraining control equipment.

In FIG. 1, the transformer 23 is equipped with a surge-absorber unit 24 composed with arresters and capacitors, and low-voltage side instrument transformer 25a, etc., and then all these accessory units and the stray capacitances of the lead-wires or the cables between the transformer and the low-voltage side breaker 22 become the minute load of the transformer secondary winding, and therefore an closed circuit of the transformer secondary side exists. Therefore the transient phenomenon is caused just after the timing $t_{open0}$ of the breaker tripping and the three-phase transient currents flow through the closed circuit of the transformer 23 secondary side, while the transformer primary circuit currents can not flow (or the of zero values).

By the way, the above-described transient currents are consumed as the thermal losses in the form of the caused eddy currents losses that are induced by the law of ampere-turn cancelation in the transformer 23 cores.

Accordingly, these transient currents and the voltages attenuate in a short period and the three phase currents values disappear or converge to the zero values simultaneously at the timing topen1 after the short period of transient duration. The three phase fluxes in the core converge to certain fixed values as the residual fluxes at the same timing $t_{open1}$ (hereinafter referred as the "residual fluxes timing for $t_{open1}$")

The secondary voltages of the transformer 23 also behave as the transient voltages on the same circuit and gradually attenuate in a short period transient duration of a few ms to several tens of ms after the timing $t_{open0}$ with the mode of free oscillation as are seen in the upper section of FIG. 2(a), and the three phase voltages values disappear or converge to the zero values simultaneously at the timing $t_{open1}$ after the short period of transient duration.

The fluxes in the cores of the transformer 23 also behave as the transient fluxes during the same transient duration between the timings $t_{open0}$ and $t_{open1}$ as are the waveforms in the lower section of FIG. 2(a), and the three phase transient fluxes values ($\phi_a(t)$, $\phi_b(t)$, $\phi_c(t)$) in the cores converge on the certain fixed values simultaneously at the timing $t_{open1}$, because the fluxes are the time integrated values of the attenuating voltages. This is the reason that the timing $t_{open1}$ is named as the true residual fluxes timing.

The converged certain fixed magnitudes of the fluxes ($\phi_a(t_{open1})$, $\phi_b(t_{open1})$, $\phi_c(t_{open1})$) in the cores of the transformer 23 at the timing $t_{open1}$ of the transient duration end are the true residual fluxes ($\phi_{ra}$, $\phi_{rb}$, $\phi_{rc}$), that would be caused whenever the transformer disconnecting operation from the power system source-side is conducted, and then the true residual fluxes can be written by the Set of equations (4). The actual residual fluxes remaining in the cores of the transformer 23 will be described as "the true residual fluxes".

Equation 4

$$\phi_{ra}\phi_a(t_{open1})$$

$$\phi_{rb}\phi_b(t_{open1})$$

$$\phi_{rc}\phi_c(t_{open1}) \quad \text{Set of Equations (4)}$$

By the way, the current tripping timing on the individual phase of the three-phase transformer 23 by the breaker 21 tripping operation is exactly simultaneous timing $t_{open0}$ without exception in case of very small energizing currents tripping of the no-load transformer. The reasons will be stated below.

In case of three phase load current tripping or fault current tripping by a breaker, individual phase current is cut off only at the timing of the current-zero as actual breaker tripping phenomenon, so that the individual phase current is cut off by the breaker 21 at the different timing from that of the other phases because the timing of current-zero in each phase is different with each other. Therefore the transient phenomenon after such tripping becomes three-phase unbalanced because of the different cut off timings even if the three phase circuit is three-phase balanced.

However, in case of the transformer 23 energizing current tripping that is the case according to the present innovation, the timing of the individual phase current tripping becomes exactly simultaneous at just the time when the breaker moving contacts is moved away from the fixed contacts, because the energizing current in the individual phase is quite a small value of probably within 1A so that the three phase currents are quite easily cut off simultaneously by the breaker 21 tripping just at the instant time when the three-phase movable contacts are simultaneously moved away from the fixed contacts, even if the current-zero timings of the three-phase current are different (current chopping phenomena). Further the mechanical movable contact opening duration time of each phase is actually same with each other.

In other words, the transformer 23 energizing current cut off timing by the breaker 21 is exactly simultaneous timing $t_{open0}$, and this is one inevitable condition for the three phase balanced transient phenomenon.

On the other hand, all the part of the closed loop circuit consisted with the transformer 23 secondary winding and the minute load of the transformer secondary winding satisfy actually three-phase balanced condition in that the transient phenomenon is caused. Further, the circuit conditions before the breaker 21 tripping are also three-phase balanced.

Therefore, all the circuit conditions before and after the breaker 21 tripping time $t_{open0}$ including all the duration of the transient phenomenon to the true residual fluxes time $t_{open1}$ are theoretically of three-phase balanced. In other words, the three-phase transient voltages, the three-phase transient currents as well as the three-phase transient fluxes behave as three-phase balanced transient quantities through the duration of the transient phenomenon from $t_{open0}$ (the breaker 21 tripping time) to $t_{open1}$ (true residual fluxes time).

Then, the waveforms of the secondary three-phase voltages as shown in the upper section of FIG. 2(a) can be represented by the vectors or phasors expression with the form of an equilateral triangle as are shown in the upper section of FIG. 2(b), and the waveforms of the fluxes as shown in the lower section of FIG. 2(a) can be represented by the vectors or phasors expression with the form of an equilateral triangle as are shown in the lower section of FIG. 2(b).

The three-phase voltages of the transformer 23 secondary circuit behaves as the three-phase balanced transient quantities during the transient duration (the time region from the breaker tripping time $t_{open0}$ to the true residual fluxes timing $t_{open1}$) and disappears at $t_{open1}$ as shown in the upper section of FIG. 2(b). So, the vectors or phasors of the secondary voltage gradually decrease in size along with the phasor rotation (a slip action) while maintaining the form of an equilateral triangle, and disappear (reach to zero values) at the timing $t_{open1}$.

In the same manner, the three-phase fluxes of the transformer 23 cores behaves as the three phase balanced transient quantities during the transient duration (the time region from the breaker tripping time $t_{open0}$ to the true residual fluxes timing $t_{open1}$), as is shown in the lower section of FIG. 2(b). So, the vectors or phasors of the three-phase fluxes gradually decrease in size as well as in rotating speed along with the phasor rotation (a slip action) while maintaining the form of an equilateral triangle, and finally reach at a standstill position (that gives certain fixed fluxes values) at the timing $t_{open1}$.

The standstill equilateral triangle of the fluxes vectors at the timing $t_{open0}$ gives certain fixed fluxes values that become the true residual fluxes in the transformer cores and remain invariably during the transformer disconnected period. Obviously, the residual fluxes maintain three-phase balanced condition as in the form of the three-phase balanced vectors while the size at the timing $t_{open1}$ would be lessened in comparison with that at the timing $t_{open0}$ as the result of the thermal loss caused in the transformer cores during the transient time region.

However obviously, the decreasing process of the vectors or phasors of the three-phase fluxes in size during the transient time region does not necessarily means that the absolute value of the residual flux in individual phase at the timing $t_{open1}$ would be lessened in comparison with the absolute flux value of the same phase at the timing $t_{open0}$. The residual flux $\phi_{ra}$ ($=\phi_a(t_{open1})$) of an arbitrary phase (assuming phase "a" for example) may theoretically become larger magnitude or may change the polarity in comparison with the flux magnitude $\phi_a(t_{open0})$ at the breaker 21 tripping time $t_{open0}$.

Now, the description will be given below of a basic concept of restraining control of the transformer 23 energizing inrush current.

It is possible to actually measure the instantaneous three-phase voltages and the waveforms of the transformer 23 over time by digital sampling process.

Also the three-phase fluxes values in the cores and the waveforms can be obtained by continuous time integration of the three-phase voltages.

When the transformer 23 is to be disconnected by the breaker tripping at $t_{open0}$, the time integrating calculation process for the three-phase fluxes can be continued over time before and after the tripping time $t_{open0}$, and the converged stand-still fluxes values at $t_{open1}$ become the true residual fluxes ($\phi_{ra}$, $\phi_{rb}$, $\phi_{rc}$).

The true tree-phase residual fluxes $\phi_{ra}$, $\phi_{rb}$, $\phi_{rc}$) are derived as absolute values with positive or negative polarities, and they are in the form of three-phase balanced equilateral vectors triangle. Also the true residual fluxes timing $t_{open1}$ can be calculated as the ending time of the transient phenomenon when the instantaneous values of the three-phase voltages of the transformer 23 simultaneously disappear or become the sero-values.

Now, the vectors or phasors of the tree-phase true residual fluxes ($\phi_{ra}$, $\phi_{rb}$, $\phi_{rc}$) are in the form of a three-phase balanced equilateral triangle, and the phase angular position of the triangle is already known as the calculation results of the residual fluxes.

On the other hand, in case when the power system source-side breaker 21 is to be closed in order to energize the transformer 23 (re-excitation), the initial energized three-phase fluxes caused by the three phase system voltages are also in the form of the three-phase balanced equilateral triangle as their nature. So, the initial energized fluxes (hereinafter referred to as the "initial energized fluxes" that will be written by the notations of ($\phi_a(\theta_{close})$, $\phi_b(\theta_{close})$, $\phi_c(\theta_{close})$) or ($\phi_a(t_{close})$, $\phi_b(t_{close})$, $\phi_c(t_{close})$)) in the individual phase of the three-phase cores of the transformer 23 are in the form of three-phase balanced equilateral triangle, where $\theta_{close}$ and $t_{close}$ are the phase angular timing position and the timing of the transformer re-excitation respectively.

Therefore, Inrush current can be effectively restrained by controlling the breaker 21 closing phase angular timing $\theta_{close}$ to meet the true residual fluxes phase angular timing $\theta_{open1}$ (which is the radian expression of the true residual fluxes timing $t_{open1}$), so that the three-phase balanced vectors equilateral triangle of the residual fluxes ($\phi_{ra}$, $\phi_{rb}$, $\phi_{rc}$) and the three-phase balanced vectors equilateral triangle of the initial energized fluxes ($\phi_a(\theta_{close})$, $\phi_b(\theta_{close})$, $\phi_c(\theta_{close})$) become nearly in the same phase for each other.

Figure 2C:
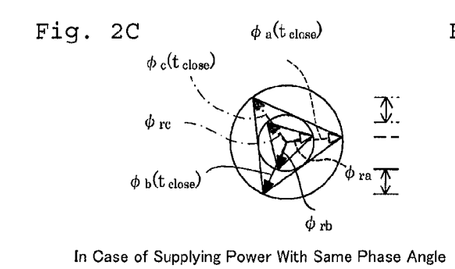
FIG. 2(c) shows the set of the vectors of the true residual fluxes and that of the initial energizing fluxes caused in the transformer cores by the power system source voltages, where the both sets of the vectors are relative in face for each other.

For example, FIG. 2(c) shows a case where the vectors phase angular position of the residual fluxes ($\phi_{ra}$, $\phi_{rb}$, $\phi_{rc}$) and that of the initial energized fluxes ($\phi_a(t_{close})$, $\phi_b(t_{close})$, $\phi_c(t_{close})$), are in phase, and the transformer 23 inrush current can be minimized to almost zero where $\theta_{close}$ is controlled to meet the angular positions $\theta_{open1}$ of the true residual fluxes vectors triangles (or to meet the absolute values and the polarities of the both sets of vectors). Especially, if the phase angles of them (the polarities and the magnitude) can be made completely coincident with each other, the transformer 23 energizing inrush currents in all three phases can be actually minimized to almost zero magnitudes.

In contrast, if the phase angle difference between the vectors equilateral triangle of the residual fluxes ($\phi_{ra}$, $\phi_{rb}$, $\phi_{rc}$) and that of the initial exciting fluxes ($\phi_a(t_{close})$, $\phi_b(t_{close})$, $\phi_c(t_{close})$) become larger, the resulted difference between the initially energized fluxes and the residual fluxes in each phase of the transformer 23 becomes larger and the caused inrush currents become larger.

Figure 2D:
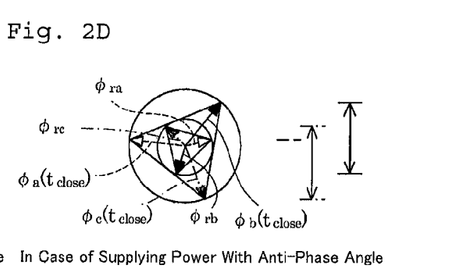
FIG. 2(d) shows the same two sets of the vectors but where they are relatively in reverse phase for each other.

As of the utmost case, FIG. 2(d) shows a case where the vectors of the residual fluxes ($\phi_{ra}$, $\phi_{rb}$, $\phi_{rc}$) and that of the initial exciting fluxes ($\phi_a(t_{close})$, $\phi_b(t_{close})$, $\phi_c(t_{close})$) in each phase becomes in almost opposite direction and the phase angular difference of each phase becomes almost largest, then the caused inrush current becomes the largest magnitudes level.

The double-headed arrows as shown in the right-hand side in the vector views of FIG. 2(c) and FIG. 2(d) indicate the differences between the magnitudes of the residual fluxes ($\phi_{ra}$, $\phi_{rb}$, $\phi_{rc}$) and that of the initial exciting fluxes ($\phi_a(t_{close})$, $\phi_b(t_{close})$, $\phi_c(t_{close})$) in each same phase.

The FIG. 2(c) shows the case in that the residual fluxes ($\phi_{ra}$, $\phi_{rb}$, $\phi_{rc}$) and the initial exciting fluxes ($\phi_a(t_{close})$, $\phi_b(t_{close})$, $\phi_c(t_{close})$) in each phase are just in phase and the timing control of the breaker reclosing is performed as of the theoretical well controlled case.

In contrast, the FIG. 2(d) shows the case in that the magnitudes and the polarities of the transformer initial energized flux $\phi_a(t_{close})$ and that of the residual flux $\phi_a(t_{open1})$ of the phase "a" are the same for each other, while the magnitudes and the polarities of the initial energized flux $\phi_b(t_{close})$ and that of the residual flux $\phi_b(t_{open1})$, of the phase "b" are different for each other and that of the phase "c" are also different.

Now, the transformer inrush current restraining control equipment 10 according to the embodiment of the present innovation will be described below with FIG. 1 and FIG. 3(a).

The transformer inrush current restraining control equipment 10 is generally provided with a voltage measuring unit 1, true residual fluxes timing calculating unit 2, a core-flux calculating unit 3, a true residual flux calculating unit 4, a breaker closing phase angular timing calculating unit 5 and the breaker closing phase angular timing controlling unit 6 switches-on the system-side breaker 21, based on the system voltages ($V_a(t)$, $V_b(t)$, $V_c(t)$) of the respective phases as measured by the voltage measuring unit 1 (the second voltage measuring section 1b) and the switching phase angle $\theta_{close}$ as calculated by the breaker closing phase angular timing calculating unit 5.

The transformer inrush current restraining control equipment 10 is further provided with a breaker tripp-timing calculating section 2b, an pseudo residual flux calculating section 4a, breaker closing timing calculating unit 7, a histogram record calculating unit 8 for the past breaker closed timings and the temporary voltage drop magnitudes calculating unit 9, upon by request.

The voltage measuring unit 1 has a function of measuring instantaneous voltages over time by digital sampling process that are derived from the system-side instrument transformer 25b and the low-voltage side instrument transformer 25a, and of generating the recorded absolute values and the polarities as well as waveforms of the voltages.

The voltage measuring unit 1 is provided with the first voltage measuring section 1a that measures the three-phase voltages ($V_{La}(t)$, $V_{Lb}(t)$, $V_{Lc}(t)$) of the transformer 23 through the low voltage side instrument transformer 25a installed at the section between the secondary side of the transformer 23 and the load-side breaker 22; and the second voltage measuring section 1b that measures the three-phase voltages ($V_a(t)$, $V_b(t)$, $V_c(t)$) of the power system source side through the system side instrument transformer 25b installed at the section between the system power source and the system-side breaker 21.

The first voltage measuring section 1a has the role to measure the phase voltages ($V_{La}(t)$, $V_{Lb}(t)$, $V_{Lc}(t)$) on the secondary side of the transformer 23 as was described. However, the measuring voltages may be replaced by the phase voltages ($V_{Ha}(t)$, $V_{Hb}(t)$, $V_{Hc}(t)$) on the primary side of the transformer 23 if they are available through the instrument transformer installed at the section between the primary side of the transformer 23 and the system-side breaker 21.

The true residual fluxes timing calculating unit 2 calculates the timing $t_{open1}$ and the timing of phase angle $\theta_{open1}$ in radian expression as the moment when the transient phenomenon after the breaker tripping is finished, which can be measured as the timing when all of three phases voltages ($V_{La}(t)$, $V_{Lb}(t)$, $V_{Lc}(t)$), that have been measured by the voltage measuring unit 1 (the first voltage measuring section 1a), are converged to zero magnitude.

A radian notation converting section 2a converts the true residual fluxes timing $t_{open1}$ into the value in radians (the true residual fluxes phase angle $\theta_{open1}$).

The breaker trip-timing calculating section 2b calculates the breaker trip-timing $t_{open0}$, that is the instantaneous timing when the excitation currents in each phase of the transformer is cutoff simultaneously and disappear just after the breaker tripping and the transient phenomenon is initiated in the transformer secondary circuit. The timing can be calculated by using phase voltages ($V_{La}(t)$, $V_{Lb}(t)$, $V_{Lc}(t)$) that have been measured by the voltage measuring unit 1 (the first voltage measuring section 1a).

The core-flux calculating unit 3 has function to integrate the three-phase voltages ($V_{La}(t)$, $V_{Lb}(t)$, $V_{Lc}(t)$) over time, which have been measured by the voltage measuring unit 1 (the first voltage measuring section 1a), and to derive fluxes values ($\phi_a(t)$, $\phi_b(t)$, $\phi_c(t)$) in the individual cores of the three-phase transformer 23.

In other words, the core-flux calculating unit 3 has a function of overtime digital integration of actually measured instantaneous values of the phase voltages ($V_{La}(t)$, $V_{Lb}(t)$, $V_{Lb}(t)$), and to obtain time-waveform flux values ($\phi_a(t)$, $\phi_b(t)$, $\phi_c(t)$) in the each phase core of the transformer 23.

By the way, the core-flux calculating unit 3 continues the calculation of time-dependent fluxes through the interval before and after the breaker trip-timing $t_{open0}$ when the exciting currents are simultaneously cut-off by the system-side breaker 21 tripping.

The true residual flux calculating unit 4 calculates the fluxes values ($\phi_a(t)$, $\phi_b(t)$, $\phi_c(t)$) at the residual fluxes timing $t_{open1}$ or at the residual fluxes phase angular timing $\theta_{open1}$, that are written by ($\phi_a(t_{open1})$, $\phi_b(t_{open1})$, $\phi_c(t_{open1})$) or ($\phi_a(\theta_{open1})$, ($\phi_b(\theta_{open1})$, $\phi_c(\theta_{open1})$), and these flux values are memorized as the true residual fluxes ($\phi_{ra}$, $\phi_{rb}$, $\phi_{rc}$) respectively, where the time dependent ($\phi_a(t)$, $\phi_b(t)$, $\phi_c(t)$) have been calculated by the core-flux calculating unit 3.

The pseudo residual flux calculating section 4a calculates the fluxes values ($\phi_a(t)$, $\phi_b(t)$, $\phi_c(t)$) at the moment of the breaker trip-timing $t_{open0}$ by the breaker tripping, that are namely pseudo residual fluxes ($\phi_a(t_{open0})$, $\phi_b(t_{open0})$, $\phi_c(t_{open0})$), where the three-phase fluxes ($\phi_a(t)$, $\phi_b(t)$, $\phi_c(t)$) have been calculated by the core-flux calculating unit 3.

The pseudo residual flux calculating section 4a outputs the pseudo residual fluxes ($\phi_a(t_{open0})$, $\phi_b(t_{open0})$, $\phi_c(t_{open0})$), to an output unit (a display unit, a printing unit, a storage medium, etc.) as indications so that an operator of the transformer 21 inrush current restraining control equipment 10 may be able to observe them.

The breaker closing phase angular timing calculating unit 5 calculates the appropriate breaker closing phase angular timing $\theta_{close}$ for the system-side breaker 21, so that the phasors of the initial exciting fluxes ($\phi_a(t_{close})$, $\phi_b(t_{close})$, $\phi_c(t_{close})$) the transformer 23 becomes in phase with that of the true residual fluxes ($\phi_{ra}$, $\phi_{rb}$, $\phi_{rc}$) where the latter have been calculated by the true residual flux calculating unit 4.

Figure 3A:
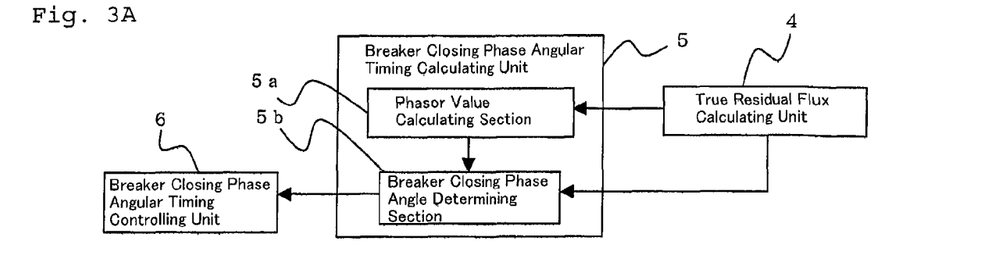
FIG. 3(a) shows a block diagram of the schematic configuration of the breaker closing phase angle calculating unit as is shown in FIG. 1.

Further, the breaker closing phase angular timing calculating unit 5 according to the embodiment of the present innovation is provided with the phasor values calculating section 5a and a breaker closing phase angle determining section 5b, as is shown in FIG. 3(a).

The phasor value calculating section 5a calculates a magnitude of the equilateral triangle (hereinafter referred to as the "phasor magnitude") "$\Phi_r$" of the true residual fluxes ($\phi_a(\theta_{open1})$, $\phi_b(\theta_{open1})$, $\phi_c(\theta open1)$), which is the length between the center point and the each apex of the equilateral triangle and is calculated by the equation (5) hereunder described, where the true residual fluxes have been calculated by the true residual flux calculating unit 4.

Equation 5

$$\Phi_r = \sqrt{-\{(2/3) \times (\{\phi_a(\theta_{open1})\}^2 + \{\phi_b(\theta_{open1})\}^2 + \{\phi_c(\theta_{open1})\}^2)\}} \quad \text{Equation (5)}$$

The breaker closing phase angular timing determining section 5b determines the breaker closing phase angular timing $\theta_{close}$ ($\theta_a$, $\theta_b$, $\theta_c$), so that it would practically meet the phasors triangle of the true residual fluxes ($\phi_a(\theta_{open1})$, $\phi_b(\theta_{open1})$, $\phi_c(\theta_{open1})$) as calculated by the true residual flux calculating unit 4, and whose phasor value "$\Phi_r$" has been calculated by the phasor value calculating section 5a and a set of equations (6) as indicated below.

Equation 6

$$\theta_a = \sin^{-1}(\phi_a(\theta_{open1})/\Phi_r)$$

$$\theta_b = \sin^{-1}(\phi_b(\theta_{open1})/\Phi_r)$$

$$\theta_c = \sin^{-1}(\phi_c(\theta_{open1})/\Phi_r) \quad \text{a set of Equations (6);}$$

The breaker closing phase angle controlling unit 6 has the role to send the closing signal of the system-side breaker 21 at the appropriate timing, which is determined by utilizing the system voltages ($V_a(t)$, $V_b(t)$, $V_c(t)$) and the appropriate breaker closing phase angle $\theta_{close}$, where the former has been obtained by the voltage measuring unit 1 (the second voltage measuring section 1b) and the latter has been calculated by the breaker closing phase angular timing calculating unit 5.

The breaker closing timing calculating unit 7, calculates an actual delay time of the breaker 21 closing action which is calculated as the duration between the issued timing of the breaker closing signal and the initial timing of the voltages ($V_{La}(t)$, $V_{Lb}(t)$, $V_{Lc}(t)$) building-up from zero value just after the breaker 21 is closed, where the issued timing of the breaker 21 closing signal is measured by the breaker closing phase angular timing controlling unit 6 and the voltages have been measured by the voltage measuring unit 1 (the first voltage measuring section 1a). Then the measured time delay of the breaker closing will be utilized in the next opportunities of the breaker closing operation as the feedback information of the breaker's specific closing duration time characteristics.

The histogram record calculating unit 8 for the breaker closing times recording measures the actual breaker 21 closing duration time as the moment of the voltages ($V_{La}(t)$, $V_{Lb}(t)$, $V_{Lc}(t)$) initial building-up caused just after the breaker 21 closing action, and the measured timing is compared with the timing of the related breaker closing signal issued, where the ($V_{La}(t)$, $V_{Lb}(t)$, $V_{Lc}(t)$) have been obtained from the voltage measuring unit 1 (the first voltage measuring section 1a). The obtained time-difference by the comparison is memorized every time when the closing operation of the breaker 21 is conducted, and is indicated on the output unit (the display unit, the printing unit, the storage medium, etc.), so that the operator of the transformer inrush current control equipment 10 may be able to observe the memorized histogram indication.

The temporary voltage drop magnitudes calculating unit 9 calculates the power system source-side voltages before and after the breaker 21 closing operation and the temporary power system voltage drop caused by inrush current just after the breaker 21 closing operation, where the voltage waveform of the system three-phase voltages ($V_a(t)$, $V_b(t)$, $V_c(t)$) have been measured by the voltage measuring unit 1 (the second voltage measuring section 1b).

The temporary voltage drop amount calculating unit 9 generates the caused temporary voltage drop values and send the output data to the output unit (the display unit, the printing unit, the storage medium, etc.) so that the operator of the inrush current control equipment 10 can observe the indication.

Figure 3B:
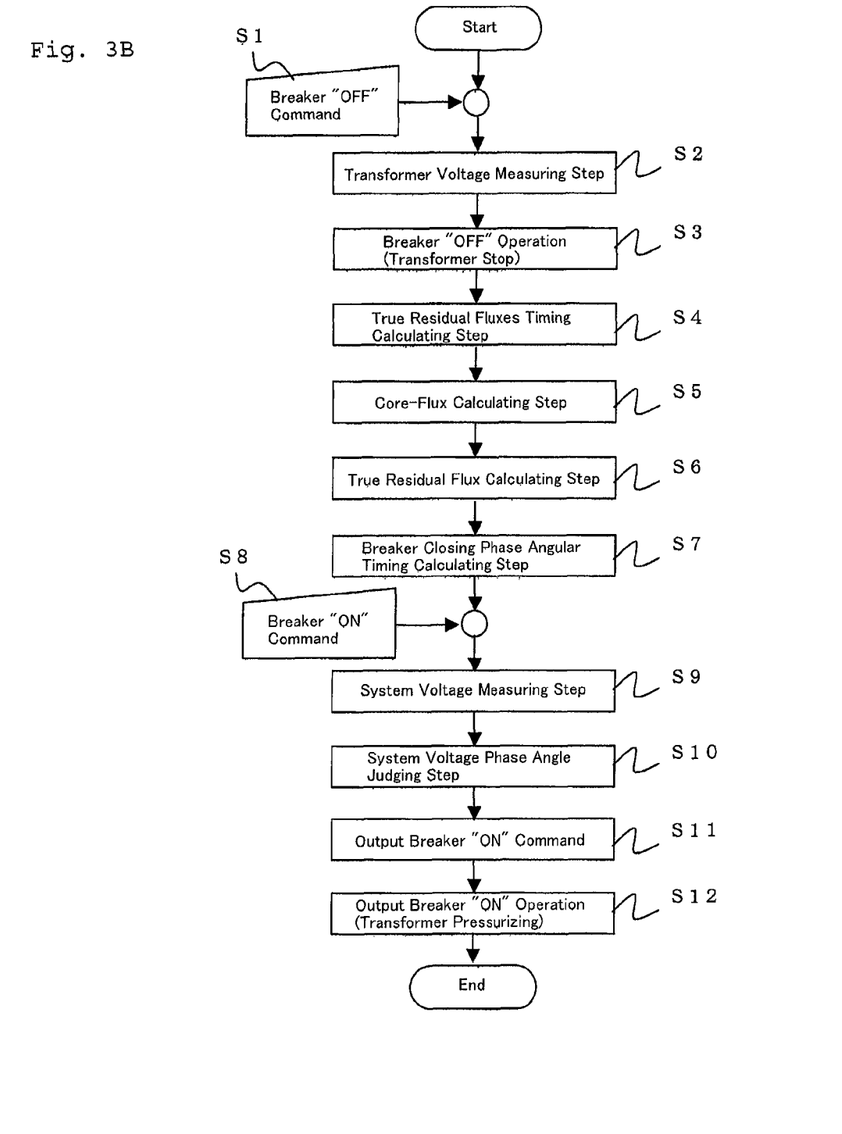
FIG. 3(b) shows the flowchart diagram of sequential processes of the transformer inrush current restraining control equipment as is shown in FIG. 1.

Now, an operational process sequence of the transformer inrush current restraining control equipment 10 according to the embodiment of the present innovation will be described with reference to FIG. 3(b).

First, the process when the transformer 23 under no-load condition is tripped by the breaker 21 is explained hereunder.

Whenever an operator try to trip the no-load transformer by the source-side breaker 21, the transformer inrush current restraining control equipment 10 receives the tripping signal of the breaker immediately after the manual operation of the breaker tripping (Step S1). Then, the first voltage measuring section 1a starts to measures the secondary side three-phase voltages values ($V_{La}(t)$, $V_{Lb}(t)$, $V_{Lc}(t)$) of the transformer 23 and the overtime measured voltage values are processed and recorded (Step S2).

The power system source-side breaker 21 begins to trip just after the tripping signal is detected, and the movable contact of the breaker is mechanically separated from the fixed contact by that the very small three phase energizing currents of the transformer are simultaneously chopped-off and the tripping operation is completed. At this moment, the transformer 23 is separated from the power system source (Step S3).

The true residual fluxes timing calculating unit 2 calculates the true residual fluxes timing $t_{open1}$ and records it by utilizing the three phase voltage values ($V_{La}(t)$, $V_{Lb}(t)$, $V_{Lc}(t)$) that are measured overtime by the first voltage measuring section 1a (Step S4). The time to radian converting section 2a in the true residual fluxes timing calculating unit 2 converts the actual cutoff timing $t_{open1}$ into the radian phase angular timing (the actual cutoff phase angle $\theta_{open1}$). Namely, the true residual fluxes timing calculating unit 2 calculates the true residual fluxes timing $t_{open1}$ and the radian phase angular timing $\theta_{open1}$ by utilizing voltage values ($V_{La}(t)$, $V_{Lb}(t)$, $V_{Lc}(t)$) that have been measured by the first voltage measuring section 1a (Step S4).

By the way, the breaker trip-time calculating section 2b also calculates and records the breaker 21 tripped timing $t_{open0}$ at which the system-side breaker 21 is tripped by utilizing voltage values ($V_{La}(t)$, $V_{Lb}(t)$, $V_{Lc}(t)$) that have been measured by the first voltage measuring section 1a overtime. However, this step is not essential to the present innovation.

The core-flux calculating unit 3 calculates instantaneous values of the three phase fluxes ($\phi_a(t)$, $\phi_b(t)$, $\phi_c(t)$) overtime by integration of the instantaneous three-phase voltages values ($V_{La}(t)$, $V_{Lb}(t)$, $V_{Lc}(t)$) that have been actually measured by the first voltage measuring section 1a (Step S5).

The true residual flux calculating unit 4 calculates the fluxes values ($\phi_a(t)$, $\phi_b(t)$, $\phi_c(t)$) at the true residual fluxes timing $t_{open1}$ or at the true residual fluxes phase angular timing $\theta_{open1}$, that are written by ($\phi_a(t_{open1})$, $\phi_b(t_{open1})$, $\phi_c(t_{open1})$) or ($\phi_a(\theta_{open1})$, $\phi_b(\theta_{open1})$, $\phi_c(\theta_{open1})$), and these flux values are memorized as the true residual fluxes (($\phi_{ra}$, $\phi_{rb}$, $\phi_{rc}$) respectively, where the time dependent values ($\phi_a(t)$, $\phi_b(t)$, $\phi_c(t)$) have been calculated by the core-flux calculating unit 3 (Step S6).

By the way, the pseudo residual flux calculating section 4a calculates the pseudo residual fluxes ($\phi_a(t_{open0})$, $\phi_b(t_{open0})$, $\phi_c(t_{open0})$) as the fluxes values at the timing $t_{open0}$. However, this step is not essential to the present innovation.

The breaker closing phase angular timing calculating unit 5 calculates the appropriate breaker closing phase angular timing $\theta_{close}$ for the power system-side breaker 21, so that the phasors equilateral triangle of the initial energizing fluxes ($\phi_a(t_{close})$, $\phi_b(t_{close})$, $\phi_c(t_{close})$) of the transformer 23 becomes in phase with that of the true residual fluxes ($\phi_{ra}$, $\phi_{rb}$, $\phi_{rc}$) where the latter has been calculated by the true residual flux calculating unit 4 (Step S7).

Namely, the breaker closing phase angular timing calculating unit 5 selects an appropriate breaker closing phase angular timing $\theta_{close}$ within the band of one cycle (one cycle: from zero degrees to 360 degrees (0[rad]~2π[rad])), so that the phasor triangle of the true residual fluxes ($\phi_a(\theta_{open1})$, $\phi_b(\theta_{open1})$, $\phi_c(\theta_{open1})$ calculated by the true residual flux calculating unit 4 and the phasor triangle of the initial exciting fluxes ($\phi_a(t_{close})$, ($\phi_b(t_{close})$, ($\phi_c(t_{close})$)) of the transformer 23 becomes almost in phase with each other.

Step S7 by which the breaker closing phase angular timing $\theta_{close}$ is to be determined includes Step S7a and Step S7b as is indicated below.

The phasor value calculating section 5a of the breaker closing phase angular timing calculating unit 5 calculates the phasor value "$\Phi_r$" of the true residual flux by utilizing the true residual fluxes ($\phi_a(\theta_{open1})$, $\phi_b(\theta_{open1})$, $\phi_c(\theta_{open1})$) that have been calculated by the true residual flux calculating unit 4 and applying Equation (5) as indicated above (Step 7a).

The breaker closing phase angular timing determining section 5b of the breaker closing phase angular timing calculating unit 5 determines the appropriate breaker 21 closing phase angular timing $\theta_{close}(\theta_a, \theta_b, \theta_c)$ by utilizing the true residual fluxes ($\phi_a(\theta_{open1})$, $\phi_b(\theta_{open1})$, $\phi_c(\theta_{open1})$), the phasor of the initial energizing fluxes ($\phi_a(t_{close})$, $\phi_b(t_{close})$, $\phi_c(t_{close})$) of the transformer 23 and the set of equations (6), where the true residual fluxes have been calculated by the true residual flux calculating unit 4 and the phasor has been calculated by the phasor value calculating section 5a (Step 7b).

Now, the operational sequencial process of the stage when the transformer 23 under out of operation is going to be energized by the breaker 21 closing operation is explained hereunder.

The transformer inrush current restraining control equipment 10 receives an closing signal of the system-side breaker 21 which is issued by manual tripping operation by an operator (Step S8). Then, the second voltage measuring section 1b starts measuring and recording operation of the three-phase instantaneous voltage values ($V_a(t)$, $V_b(t)$, $V_c(t)$) over time (Step S9).

The breaker closing phase angle controlling unit 6, immediately after receiving the breaker 21 closing signal which is issued by the operator's manual operation, begins to calculate the phase angle radian values of the system source-side three-phase voltages by utilizing the system source-side instantaneous voltages ($V_a(t)$, $V_b(t)$, $V_c(t)$) (Step 10).

The breaker closing phase angle controlling unit 6 issues a breaker 21 closing signal so as the breaker 21 to be closed at the appropriate timing $\theta_{close}$ and the transformer 23 is to be put into operation, where the breaker's required closing duration time is to be taken into account and compensated (Step S11).

The system source-side breaker 21 begins to close by the mechanical action of the movable contact just after a closing signal is received from the breaker closing phase angle controlling unit 6, and the transformer 23 is put into no-load energizing condition (Step S12).

Figure 4A:
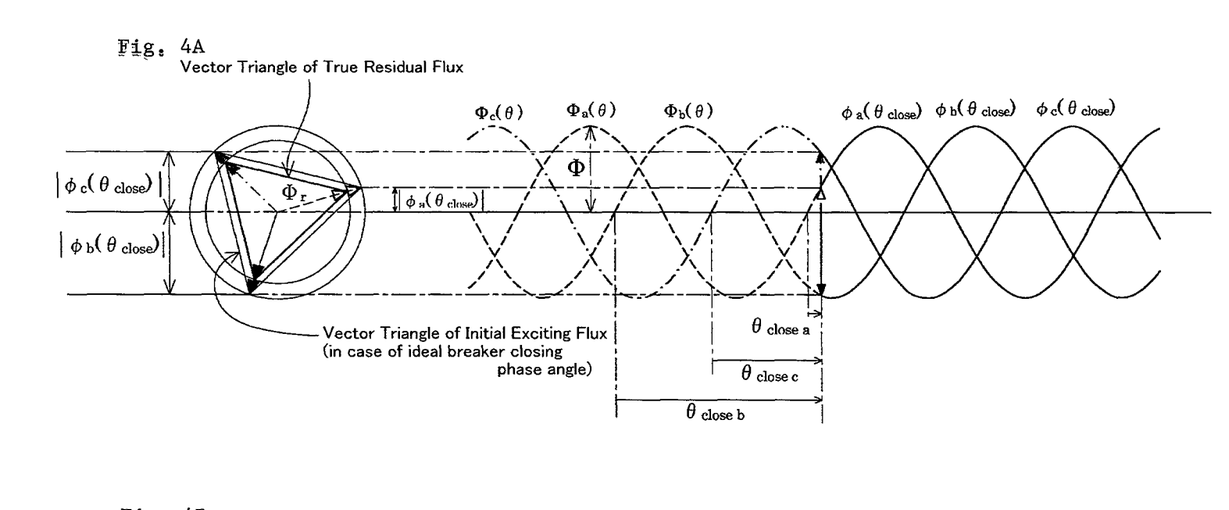
FIG. 4(a) shows waveforms of the three-phase balanced initial energizing fluxes just after the transformer energization by the related breaker closing operation together with the expression of the phasor equilateral triangle, where the rotating phasor equilateral triangle of the initial energization fluxes and that of the standstill phasor equilateral triangle of the true residual fluxes are coincident with each other.

Further with the embodiment of the present innovation, appropriate timing control of the breaker 21 closing phase angular timing $\theta_{close}$ for the system-side breaker 21 can be yielded so that the phasor equilateral triangle of the initial energizing fluxes ($\phi_a(t_{close})$, $\phi_b(t_{close})$, $\phi_c(t_{close})$) of the transformer 23 becomes almost in phase with that of the true residual fluxes ($\phi_{ra}$, $\phi_{rb}$, $\phi_{rc}$, as is shown in FIG. 4(a).

Further, the breaker closing phase angle controlling unit 6 controls the breaker 21 closing timing $\theta_{close}$, so that the $\theta_{close}$ (of phase-a as of criterion) meets with the actual tripping timing $\theta_{open1}$ (of phase-a as of the same criterion), and as the result, the phasor equilateral triangle of the initial energizing fluxes ($\phi_a(t_{close})$, $\phi_b(t_{close})$, $\phi_c(t_{close})$) of the transformer 23 and that of the true residual fluxes ($\phi_{ra}$, $\phi_{rb}$, $\phi_{rc}$, become in phase with each other.

Figure 4B:
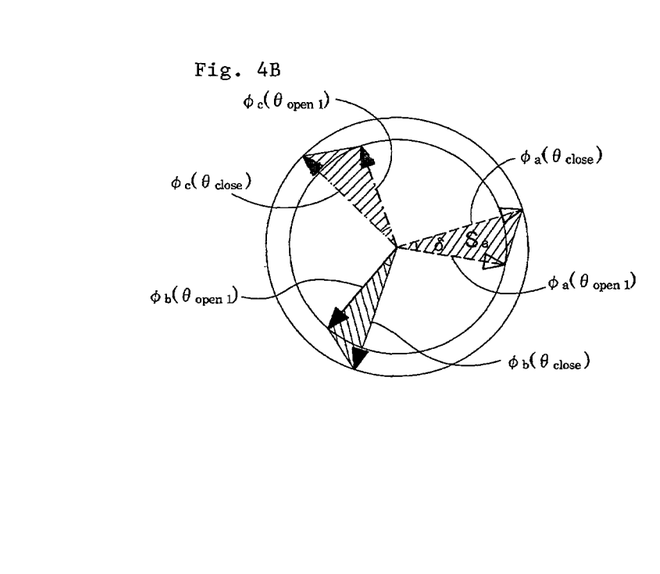
FIG. 4(b) shows the explanation of the control method so that to coincide the phase angle of the equilateral triangle of the three-phase balanced initial energizing fluxes to that of the true residual fluxes.

By the way, the other methods as variations of this innovation in that the phase angles of the initial energizing flux phasor (e.g., (($\phi_a(\theta_{close})$)) is to be controlled to meet almost in phase with that of the true residual fluxes phasor (e.g., (($\phi_a(\theta_{open1})$)) can be realized as is described below and the FIG. 4(b) is such one typical example.

The first method is to reduce a scalar product "$\phi_a(\theta_{open1}) \cdot \phi_a(\theta_{close})=|\phi_a(\theta_{open1})||\phi_a(\theta_{close})|\cos \delta$" of the true residual flux $\phi_a(\theta_{open1})$ and the transformer initial energizing flux $\phi_a(\theta_{close})$ to zero (0), wherein "$\delta$" being an angle between the vectors of "$\phi_a(\theta_{open1})$" and "$\phi_a(\theta_{close})$".

The second method is to reduce the length of the third side of a triangle as shorter as possible where the other two sides of the triangle are the phasors of the true residual flux $\phi_a(\theta_{open1})$ and the initial energizing flux $\phi_a(\theta_{close})$.

The third method is to reduce an area "$S_a$" of a triangle having two sides of the true residual flux $\phi_a(\theta_{open1})$ and the initial energized flux $\phi_a(\theta_{close})$ (or a vector product "$\phi_a(\theta_{open1}) \times \phi_a(\theta_{close1})=|_a(\theta_{open1})||\phi_a(\theta_{close})|\sin \delta$" to zero (0).

The fourth method is control so that differenced vectors or a scalar values between the vector of the effective residual fluxes ($\phi_a(\theta_{open1})$, $\phi_b(\theta_{open1})$, $\phi_c(\theta_{open1})$) of the respective phases and that of the initial energizing fluxes ($\phi_a(\theta_{close})$, $\phi_b(\theta_{close})$, $\phi_c(\theta_{close})$) of the respective phases become equal with each other. (namely to satisfy as follows ($\Delta|\phi_a(\theta_{open1})-\phi_a(\theta_{close})|=|\phi_b(\theta_{close})|=|\phi_c(\theta_{open1})-\phi_c(\theta_{open1})|$)).

The following functional step may be added after the Step 12, if preferable while they are not essential.

The breaker closing timing calculating unit 7 calculates an actual clock time at which the three-phase voltages begin to builds-up simultaneously by the breaker 21 closing operation where the three phase voltages ($V_{La}(t)$, $V_{Lb}(t)$, $V_{Lc}(t)$) measured by the first voltage measuring section 1a are utilized.

Further, The breaker closing timing calculating unit 7 calculates measured time-interval of the breaker 21 closing action as the timing difference between the timing of the breaker closing signal issue and the completion timing of the breaker closing action, where the timing of the breaker 21 closing signal issue is obtained from the breaker closing phase angle controlling unit 6.

With this procedure, accurate prediction of the time-duration of the breaker 21 closing action become possible which becomes dood reference for the accurate breaker closing timing control.

The histogram record calculating unit 8 for the past breaker closed timings calculates a histogram of the phase angles of the power system source-side three-phase voltages when the breaker 21 is closed, where the measured three phase voltages ($V_{La}(t)$, $V_{Lb}(t)$, $V_{Lc}(t)$) by the first voltage measuring section 1a are utilized.

The temporary voltage drop magnitudes calculating unit 9 calculates the power system source-side three-phase voltages before and after the breaker 21 closing operation by utilizing the voltage waveforms of the system voltages ($V_a(t)$, $V_b(t)$, $V_c(t)$ measured by the second voltage measuring section 1b, and calculates caused temporary voltage drop magnitudes.

As is described above, the transformer inrush current restraining control equipment 10 according to the embodiment of the present innovation calculates the true residual fluxes in the cores of the transformer 23 where the transient phenomenon caused just after the breaker 21 tripping is taken into account. Further based on the calculated true residual fluxes, the equipment calculates the appropriate phase angular timing of the breaker 21 closing in order to minimize the inrush current of the transformer 23.

Further based on the above calculation, the transformer inrush current restraining control equipment 10 according to the embodiment of the present innovation has a function to conduct the breaker 21 closing operation so as to minimize the inrush current.

Second Embodiment

Figure 5A:
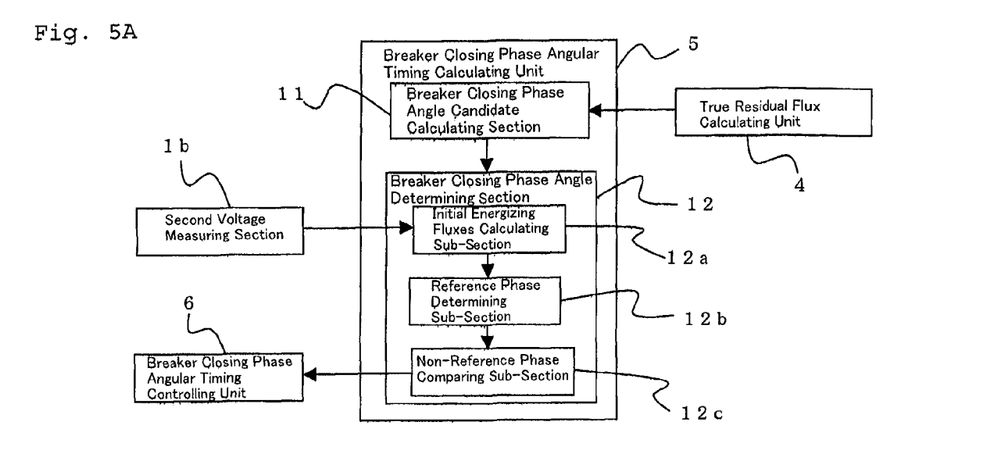
FIG. 5(a) shows the block diagram of the schematic configuration of the breaker closing phase angular timing calculating unit according to the second embodiment of the present innovation.
Figure 5B:
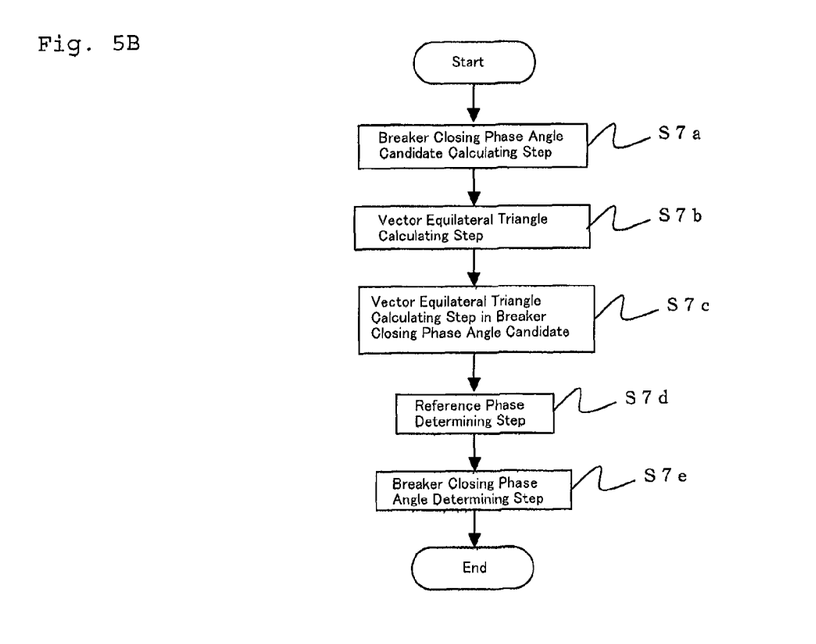
FIG. 5(b) shows a flowchart explaining detail processes of the Step S7 in the FIG. 3 by the breaker closing phase angle calculating unit as is shown in FIG. 5(a).

FIG. 5(*a*) shows a block diagram for a schematic configuration of the breaker 21 closing phase angular timing calculation unit according to the second embodiment of the present innovation; and FIG. 5(*b*) is a flowchart showing in detail a process of Step S7 as shown in FIG. 3, which is carried out by the breaker 21 closing phase angular timing calculation unit as shown in FIG. 5(*a*). In FIG. 5, the individual reference numerals are commonly used with that in FIGS. 1 to 4 and they shows commonly the same or corresponding parts respectively, so that the description of them will be omitted hereunder.

The breaker closing phase angular timing calculating unit 5 according to the embodiment of the present innovation calculates the breaker 21 closing phase angle $\theta_{close}$, where the magnitudes (absolute values) and the polarities of the true residual fluxes ($\phi_{ra}$, $\phi_{rb}$, $\phi_{rc}$) of each phase calculated by the true residual flux calculating unit 4 are taken into account.

The breaker 21 closing phase angle $\theta_{close}$ is determined so that the individual phase polarities of the initial energized core fluxes ($\phi_a(\theta_{close})$, $\phi_b(\theta_{close})$, $\phi_c(\theta_{close})$) caused just after the breaker 21 is closed and that of the phase angles of the true residual fluxes ($\phi_{ra}$, $\phi_{rb}$, $\phi_{rc}$) in the core of the transformer 23 coincide with each other under ordinal power system source-side voltages ($V_a(t)$, $V_b(t)$, $V_c(t)$), and further so that the absolute magnitude of the initial energized core flux of the first phase coincides with the absolute magnitude of the true residual flux of the same first phase, where the first phase is one arbitrary phase among the three phases.

The breaker closing phase angular timing calculating unit 5 according to the embodiment of the present innovation is provided with the breaker closing phase angles candidate value calculating section 11 and the breaker closing phase angle determining section 12 as shown in FIG. 5(*a*).

The breaker closing phase angles candidate value calculating section 11 calculates two candidate values of phase angles $\theta_\alpha$, $\theta_\beta$ as the candidates of the breaker 21 closing phase angular timing $\theta_{close}$ by that the magnitude and the polarity of the initial energizing core flux and that of the true residual flux in the same first phase coincide with each other where the first phase is arbitrary one phase among the three phases.

The breaker closing phase angle determining section 12 calculates phase angles that are deviated by $2\pi/3$ radians or $-2\pi/3$ radians from the two candidate values $\theta_\alpha$, $\theta_\beta$ of the breaker 21 closing angular timing $\theta_{close}$, and calculate the predicted initial energizing flux values in the second and the third phases at the above phase deviated phase angles. Further the difference values between the above calculated predicted initial energizing flux values and the true residual fluxes in the second phase as well as in the third phase are compared for the two candidate values $\theta_\alpha$ and $\theta_\beta$. If the difference in case of one of $\theta_\alpha$, $\theta_\beta$, are smaller than the difference in case of the another, the former candidate value is selected as the breaker closing phase angular timing θclose.

The breaker closing phase angle determining section 12 is provided with an initial energizing fluxes calculating sub-section 12a, a reference phase determining sub-section 12b, and a non-reference phases comparing sub-section 12c.

The initial energizing fluxes calculating sub-section 12a calculates three phase steady-state initial energizing fluxes ($\Phi_a(\theta)$, $\Phi_b(\theta)$, $\Phi_c(\theta)$) of the transformer 23 by overtime integration of three phase voltages ($V_{La}(t)$, $V_{Lb}(t)$, $V_{Lc}(t)$) that have been detected by the voltage measuring unit 1 (the second voltage measuring section 1c), and convert them to the initial energizing fluxes by radian expression ($\Phi_a(\theta)$, $\Phi_b(\theta)$, $\Phi_c(\theta)$). Then the sub-section 12a generates vector equilateral triangle of the initial energizing fluxes whose one side length is one per unit (1.0).

The reference phase determining sub-section 12b determines a reference phase by utilizing the initial energizing fluxes that have been calculated by the initial energizing fluxes calculating sub-section 12a, and the reference phase is used as the base reference for the comparison of initial energizing fluxes and the true residual fluxes.

The non-reference phase comparing sub-section 12c compares the initial energizing fluxes and the true residual fluxes of the non-reference two phases for the two candidate values $\theta_\alpha$ and $\theta_\beta$, and finally determine the breaker 21 closing phase angular timing $\theta_{close}$ as the choice from the two candidate values $\theta_\alpha$ and $\theta_\beta$.

Now, description will be given in detail below of Step S7 for determining the breaker closing phase angular timing $\theta_{close}$ by the breaker closing phase angular timing calculating unit 5 according to the embodiment of the present innovation, with reference to FIG. 5(*b*).

First, the breaker closing phase angles candidate value calculating section 11 calculates two candidate values of phase angles $\theta_\alpha$, $\theta_\beta$ (two values in the range of 0[rad] to $2\pi$[rad]) as the candidates of the breaker 21 closing phase angular timing $\theta_{close}$ so as that the magnitude and the polarity of the initial energized core flux and that of the true residual flux in the same first phase coincide with each other, where $\theta_\alpha$, $\theta_\beta$ are the phase angles of the segment line connecting the reference phase-apex and the center of the vector equilateral triangle (the phasor) of the true residual fluxes ($\phi_a(\theta_{open1})$, ($\phi_b(\theta_{open1})$, ($\phi_c(\theta_{open1})$) that have been calculated by the true residual flux calculating unit 4. Further, the first phase is arbitrary one phase among the three phases (Step S7a).

The initial energizing fluxes calculating sub-section 12a calculates three phase steady-state initial energizing fluxes ($\Phi_a(t)$, $\Phi_b(t)$, $\Phi_c(t)$) of the transformer 23 by overtime integration of three-phase voltages ($V_{La}(t)$, $V_{Lb}(t)$, $V_{Lc}(t)$) that have been detected by the voltage measuring unit 1 (the second voltage measuring section 1b), and convert them to the initial energizing fluxes by radian expression ($\Phi_a(\theta)$, $\Phi_b(\theta)$, $\Phi_c(\theta)$). Then the sub-section 12a generates vector equilateral triangle of the initial energizing fluxes whose one side length is one per unit (1.0) by applying the following set of equations (7) (Step S7b).

Equation 7

$$\Phi_a = \Phi \cos(\theta)$$

$$\Phi_b = \Phi \cos(\theta - 2\pi/3)$$

$$\Phi_c = \Phi \cos(\theta + 2\pi/3) \quad \text{Set of Equations (7)}$$

The initial energizing fluxes calculating sub-section 12a calculates the vector equilateral triangle of the initial energizing flux under the condition of the candidate breaker closing phase angle $\theta_\alpha$ and that under the candidate breaker closing phase angle $\theta_\beta$ by applying the following set of equations (9) (Step S7c).

Equation 8

$$\Phi_a(\theta_\alpha) = \Phi \cos(\theta_\alpha)$$

$$\Phi_b(\theta_\alpha) = \Phi \cos(\theta_\alpha - 2\pi/3)$$

$$\Phi_c(\theta_\alpha) = \Phi \cos(\theta_\alpha + 2\pi/3) \quad \text{Set of Equations (8)}$$

Equation 9

$$\Phi_a(\theta_\beta) = \Phi \cos(\theta_\beta)$$

$$\Phi_b(\theta_\beta) = \Phi \cos(\theta_\beta - 2\pi/3)$$

$$\Phi_c(\theta_\beta) = \Phi \cos(\theta_\beta + 2\pi/3) \quad \text{Set of Equations (9)}$$

The reference phase determining sub-section 12b determines a reference phase by utilizing the initial energizing fluxes that have been calculated by the initial energizing fluxes calculating sub-section 12a, and the reference phase is used as the base reference for the comparison of initial energizing fluxes and the true residual fluxes (Step S7d).

For more detail, the reference phase determining sub-section 12b determines one phase from the three phases as the reference phase that has the minimum value of $|\Phi_a(\theta_\alpha) - \phi_a(\theta_{open1})|$, $|\Phi_b(\theta_\alpha) - \phi_b(\theta_{open1})|$, and $|\Phi_c(\theta_\alpha) - \phi_c(\theta_{open1})|$. Or as the alternative, the reference phase determining sub-section 12b determines one phase from the three phases as the reference phase that has the minimum value of $|\Phi_a(\theta_\beta) - \phi_a(\theta_{open1})|$, $|\Phi_b(\theta_\beta) - \phi_b(\theta_{open1})|$, and $|\Phi_c(\theta_\beta) - \phi_c(\theta_{open1})|$.

The reference phase determining sub-section 12b according to the embodiment of the present innovation has been described so as to determine the phase having the minimum value as the reference phase. However, this sub-section 12b may determine, as the alternative methods of determining the reference phase, a "phase having the maximum value", or a "phase having an intermediate value" or a "previously selected arbitrary one phase". However, it is preferable to determine the phase having the minimum value as the reference phase, because the difference distinction of the best and worst phase angles of breaker 21 closing becomes easier over all.

The explanation hereunder will be described under the assumption that the phase-a has been determined as the reference phase, because the compared difference of the phase-a was the smallest among the differences of the three phases-a, b, c as the result of the calculation by the reference phase determining sub-section 12b.

The non-reference phase comparing sub-section 12c in the breaker closing phase angle determining section 12 is the part for the calculation of quantities of the non-reference phase, and it compares the differences between the magnitudes of initial energizing fluxes and that of the true residual fluxes, and then determine the breaker 21 closing phase angular timing $\theta_{close}$ (Step S7e).

For more detail, the non-reference phase comparing sub-section 12c determines the candidates $\theta_\alpha$ as the breaker 21 closing phase angular timing $\theta_{close}$, if $|\Phi_b(\theta_\alpha) - \phi_b(\theta_{open1})| < |\Phi_b(\theta_{open1})|$ is derived in the above described calculation (the comparison case1). Alternatively, the non-reference phase comparing sub-section 12c determines the candidates $\theta_\beta$ as the breaker 21 closing phase angle timing $\theta_{close}$, if $|\Phi_c(\theta_\alpha) - \phi_c(\theta_{open1})| > |\Phi_c(\theta_\beta) - \phi_c(\theta_{open1})|$ is derived in the above described calculation (the comparison case2). By the way, the resulted determination by the comparison case1 and that by the comparison case2 theoretically coincide with each other.

The breaker closing phase angle controlling unit 6 records and memorizes the calculated result $\theta_{close}$ as the appropriate phase angular timing when the transformer 23 to be re-energized by the breaker 21 closing operation in the next chance, which is calculated by the breaker closing phase angle timing calculating unit 5.

The second embodiment as described above of the present innovation is different from the first embodiment of the present innovation only in the configuration of the breaker closing phase angular timing calculating unit 5. The same functional effects can be expected by the second embodiment of the present innovation as well as by the first embodiment of the present innovation.

Third Embodiment

Figure 6A:
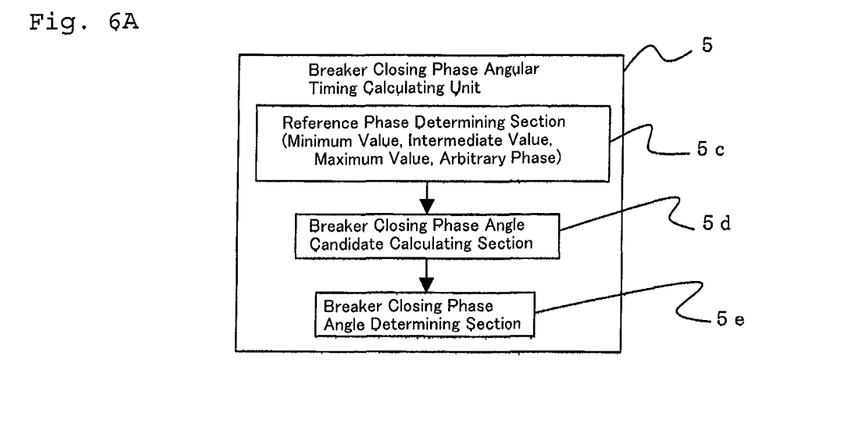
FIG. 6(a) shows the block diagram of schematic configuration of the breaker closing phase angular timing calculating unit according to the third embodiment of the present innovation.

FIG. 6(*a*) shows a block diagram for a schematic configuration of the breaker 21 closing phase angular timing calculation unit according to the second embodiment of the present innovation. In FIG. 6(*a*), the individual reference numerals are commonly used with that in FIGS. 1 to 5 and they shows commonly the same or corresponding parts respectively, so that the description of them will be omitted hereunder.

The breaker closing phase angular timing calculating unit 5 according to the embodiment of the present innovation is provided with the reference phase determining sub-section 5c, the breaker closing phase angles candidate value calculating section 5d and the breaker closing phase angle determining section 5e, where the reference phase determining sub-section 5c determines a reference phase as the basis of the breaker 21 closing phase angular timing calculation, the breaker closing phase angles candidate value calculating section 5d calculates two candidate values of phase angles $\theta_\alpha$, $\theta_\beta$ as the candidates of the breaker 21 closing phase angular timing $\theta_{close}$. Further, the breaker closing phase angle determining section 5e determines the breaker 21 closing phase angular timing $\theta_{close}$ from the two candidate timings, that is, the case of FIG. 2(*c*) is to be selected and the case of FIG. 2(*d*) is to be rejected.

The reference phase determining section 5c conducts a comparison of the absolute values (the magnitude, the scalar value) of the true residual fluxes ($\phi_a(t_{open1})$, $\phi_b(t_{open1})$, $\phi_c(t_{open1})$) or ($\phi_a(\theta_{open1})$, $\phi_b(\theta_{open1})$, $\phi_c(\theta_{open1})$), and then determines one phase (for example, the phase "a") as the reference phase in that the compared absolute value becomes minimum among that of the three-phases.

The reference phase determining sub-section 5c may determine, as the alternative methods of determining the reference phase, a "phase having the maximum value", or a "phase having an intermediate value" or a "previously selected arbitrary one phase". However, it is preferable to determine the phase having the minimum value as the reference phase, because the difference distinction of the best and worst phase angles of breaker 21 closing becomes easier over all.

The breaker closing phase angles candidate value calculating section 5d compares the magnitude and the polarity of the initial energizing core flux ($\phi_a(t_{close})$ or $\phi_a(\theta_{close})$) and that of the true residual flux ($\phi_a(t_{open1})$ or ($\phi_a(\theta_{open1})$) in the reference phase, and find the two phase angular timings as the Breaker 21 closing phase angle candidates where the magnitudes and the polarities of them coincide with each other (such candidate phase angles exist twice per one cycle).

The breaker closing phase angle determining section 5e determine the breaker 21 closing phase angle as the best angle by selection from the two candidates of the breaker 21 closing phase angle timings that have been calculated by the breaker closing phase angles candidate value calculating section 5d, so as whose magnitude and the polarity of the initial energizing core flux ($\phi_b(t_{close})$ or ($\phi_b(\theta_{close})$)) and that of the true residual flux ($\phi_b(t_{open1})$ or ($\phi_b(\theta_{open1})$)) in the reference phase-a coincide with each other.

For more detail, there are twice of phase anguler timings per cycle in that the magnitude and the polarity in one phase (phase-a or phase-b, or phase-c) of the vector equilateral triangle of the true residual fluxes ($\phi_a(t_{open1})$, $\phi_b(t_{open1})$, $\phi_c(t_{open1})$)) or ($\phi_a(\theta_{open1})$, $\phi_b(\theta_{open1})$, $\phi_c(\theta_{open1})$)) and that of the initial energizing fluxes ($\phi_a(t_{close})$, $\phi_b(t_{close})$, $\phi_c(t_{close})$) or ($\phi_a(\theta_{close})$, $\phi_b(\theta_{close})$, $\phi_c(\theta_{close})$)), become in phase with each other. And further, one of the twice phase angular timings becomes the best timing in that the relative phase angle position of the two vector equilateral triangles almost coincide with each other.

So, the breaker closing phase angle determining section 5e conducts the distinction work of the best and the worst phase angle timings of the breaker 21 closing by comparing the polarities of the true residual fluxes and of the initial energizing core fluxes in the two non-reference phases, where the two candidate timings have been calculated by the breaker closing phase angles candidate value calculating section 5d.

The above described third embodiment of the present innovation is different from the first embodiment of the present innovation only in the configuration of the breaker closing phase angular timing calculating unit 5. The same functional effects can be expected by the third embodiment of the present innovation as well as by the first embodiment of the present innovation.

Fourth Embodiment

Figure 6B:
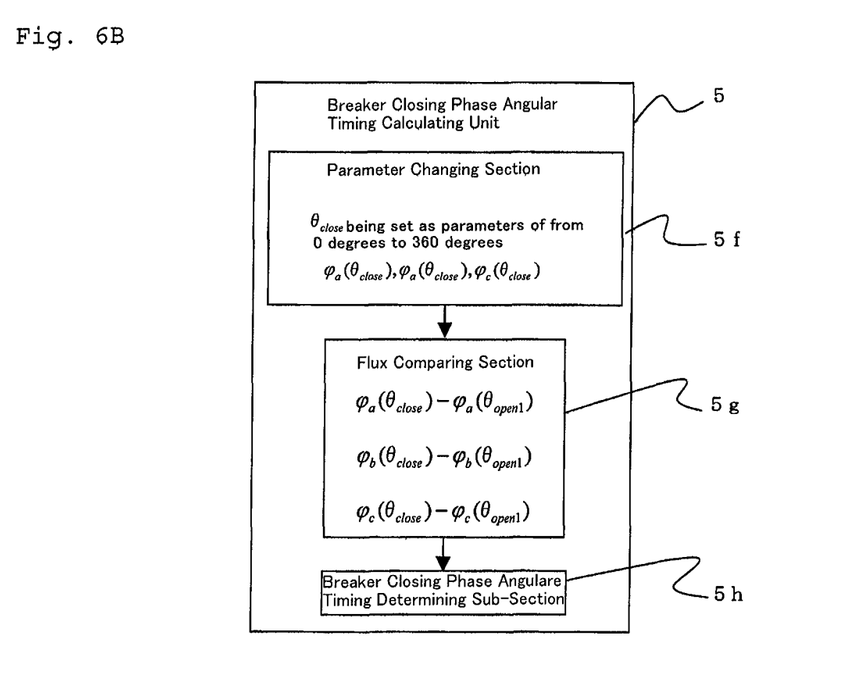
FIG. 6(b) shows the block diagram of the schematic configuration of the breaker closing phase angular timing calculating unit according to the fourth embodiment of the present innovation.
Figure 7:
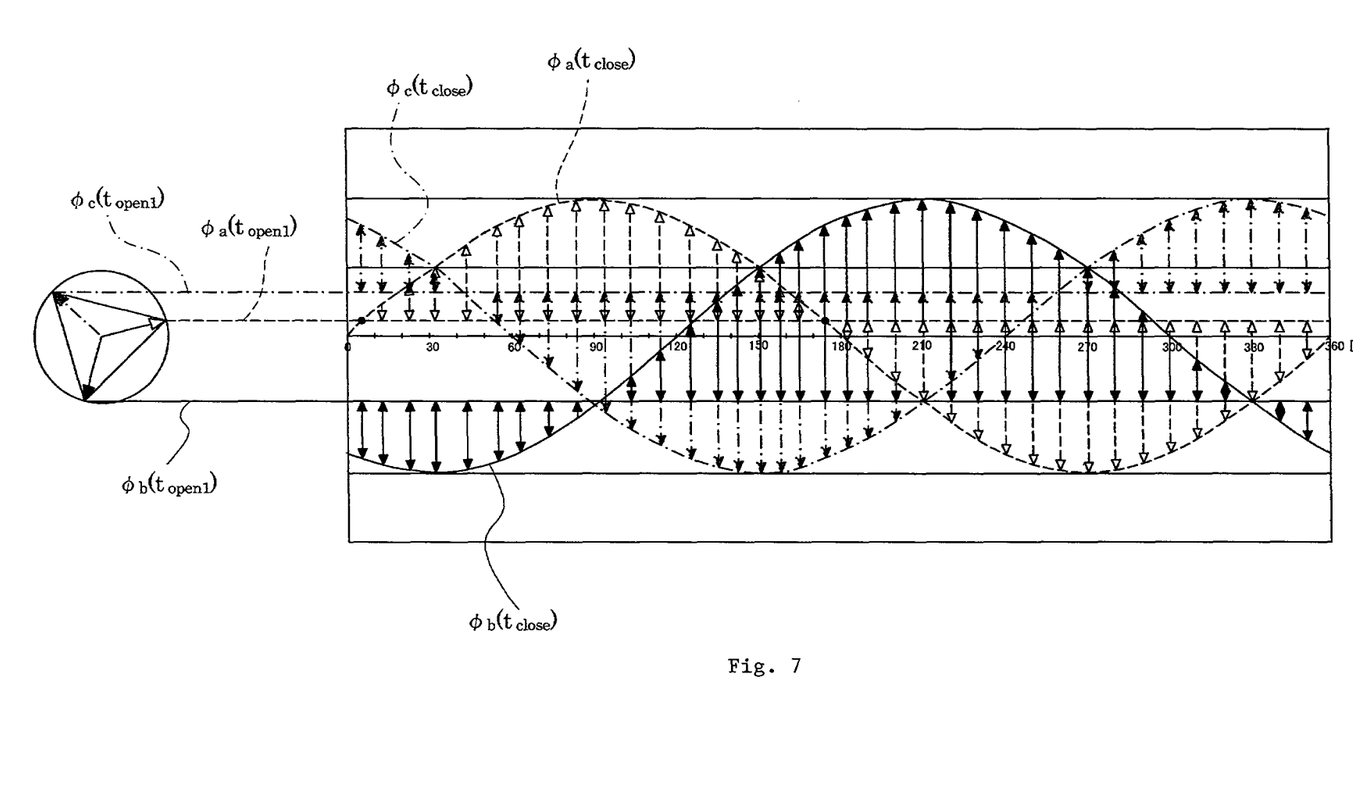
FIG. 7 shows the explanation of the relative relation of the initial energizing fluxes values and the true residual fluxes values under the parametric range of the breaker closing angular timing from 0 degrees to 360 degrees.

FIG. 6(b) shows a block diagram for a schematic configuration of the breaker 21 closing phase angular timing calculation unit according to the second embodiment of the present innovation. FIG. 7 is a descriptive view showing a relationship between the true residual flux and the initial energizing fluxes where the breaker 21 closing phase angular timing are varied in the range of from 0 degrees to 360 degrees as the parameter. In FIG. 6(b), the individual reference numerals are commonly used with that in FIGS. 1 to 5 and they shows commonly the same or corresponding parts respectively, so that the description of them will be omitted hereunder.

The breaker closing phase angular timing calculating unit 5 according to the embodiment of the present innovation is provided with the parameter changing sub-section 5f in that the phase angular timing as the parameter is changed in the angular range of between 0 degrees 360 degrees (0[rad]~2π [rad]), the fluxes comparing sub-section 5g in that the magnitude difference between the initial energized flux as with the changing parameter of the phase angular timing and the true residual flux of the same phase is calculated, the breaker closing phase angular timing determining sub-section 5h in that the phase angle parameter at which the magnitude difference becomes the smallest is determined as the breaker 21 closing phase angular timing.

The parameter changing sub-section 5f calculates the initial energizing fluxes (($\phi_a(t_{close})$, $\phi_b(t_{close})$, $\phi_c(t_{close})$) or ($\phi_a(\theta_{close})$, $\phi_b(\theta_{close})$, $\phi(\theta_{close})$))) by changing the breaker 21 closing phase angular timing $t_{close}$ (the closing phase angle θclose) under the parametric range of 0 degrees 360 degrees (0[rad]~2π[rad]). (in other words, to conduct calculation of various states under the condition of rotating the vector equilateral triangle of the initial energizing fluxes).

The fluxes comparing sub-section 5g compare the initial energizing fluxes (($\phi_a(t_{close})$, $\phi_b(t_{close})$, $\phi_c(t_{close})$)) or ($\phi_a(\theta_{close})$, $\phi_b(\theta_{close})$, $\phi(\theta_{close})$))) and the true residual fluxes $\phi_a(t_{open1})$, $\phi_b(t_{open1})$, $\phi_c(t_{open1})$)) or $\phi_a(\theta_{open1})$, $\phi_b(\theta_{open1})$, $\phi_c(\theta_{open1})$)) of the same phase under the parametric range of 0 degrees 360 degrees that have been calculated by the parameter changing sub-section 5f, and calculate the differences of the magnitudes of the both fluxes (($\phi_a(t_{close})$-$\phi_a(t_{open1})$, $\phi_b(t_{close})$-$\phi_b(t_{open1})$, $\phi_c(t_{close})$-$\phi_c(t_{open1})$)) or ($\phi_a(\theta_{close})$-$\phi_a(\theta_{open1})$, $\phi_b(\theta_{close})$-$\phi_b(\theta_{open1})$, $\phi_c(\theta_{close})$-$\phi_c(\theta_{open1})$))).

The breaker closing phase angular timing determining sub-section 5h determines the initial energizing fluxes phase angular timing $\theta_{close}$ where the timing is selected so that the magnitude difference between the initial energizing flux and the true residual flux of the same phase becomes the smallest.

The fourth embodiment as described above of the present innovation is different from the first embodiment of the present innovation only in the configuration of the breaker closing phase angular timing calculating unit 5. The same functional effects can be expected by the fourth embodiment of the present innovation as well as by the first embodiment of the present innovation.

Other Embodiments

The breaker closing phase angular timing calculating unit 5 may have a configuration to calculate the vector equilateral triangles of the true residual fluxes (($\theta_a(t_{open1})$, $\phi_b(t_{open1})$, $\phi_c(t_{open1})$)) or ($\phi_a(\theta_{open1})$, $\phi_b(\theta_{open1})$, $\phi_c(\theta_{open1})$))) and that of the initial energizing fluxes (($\phi_a(t_{close})$, $\phi_b(t_{close})$, $\phi_c(t_{close})$) or ($\phi_a(\theta_{close})$, $\phi_b(\theta_{close})$, $\phi_c(\theta_{close})$))) and calculate the breaker closing phase angle $\theta_{close}$ so that the difference of the area sizes of the two equilateral triangles becomes minimum by the selected phase angle timing $\theta_{close}$.

The breaker closing phase angular timing calculating unit 5 calculates the vector equilateral triangles of the true residual fluxes (($\phi_a(t_{open1})$, $\phi_b(t_{open1})$, $\phi_c(t_{open1})$)) or ($\phi_a(\theta_{open1})$, $\phi_b(\theta_{open1})$, $\phi_c(\theta_{open1})$)) and the initial energizing fluxes (($\phi_a(t_{close})$, $\phi_b(t_{close})$, $\phi_c(t_{close})$) or $\phi_a(\theta_{close})$, $\phi_b(\theta_{close})$, $\phi_c(\theta_{close})$))).

Further, the breaker closing phase angular timing calculating unit 5 calculates the timing phase $\theta_{close}$ at which the vector (($\phi_a(t_{open1})$-$\phi_a(t_{open1})$) or ($\phi_a(\theta_{open1})$-$\phi_a(\theta_{close})$))) becomes the minimum, and calculates the timing phases θbclose, θcclose for the remaining two phases in the same manner. The breaker closing phase angular timing calculating unit 5 may have the function to check and determine the breaker 21 closing phase angular timing $\theta_{aclose}$ so that the timing phases $\theta_{aclose}$, $\theta_{bclose}$, $\theta_{cclose}$ become three phase balanced with the approximately 120 degrees ($2\pi/3$[rad]) angle difference of each other.

DESCRIPTION OF REFERENCE NUMERALS

1 voltage measuring unit
1a first voltage measuring section
1b second voltage measuring section
2 true residual fluxes timing calculating unit
2a radian notation converting section
2b breaker trip-timing calculating section
3 core-flux calculating unit
4 true residual flux calculating unit
4a pseudo residual flux calculating section
5 breaker closing phase angular timing calculating unit
5a phasor value calculating section
5b breaker closing phase angle determining section
5c reference phase determining section
5d breaker closing phase angle candidate calculating section
5e breaker closing phase angle determining section
5f parameter changing section
5g flux comparing section
5h breaker closing phase angular timing determining sub-section
6 breaker closing phase angular timing controlling unit
7 breaker closing timing calculating unit
8 histogram record calculating unit
9 temporary voltage drop magnitudes calculating unit
10 transformer inrush current restraining control equipment
11 breaker closing phase angle candidate calculating section
12 breaker closing phase angle determining section
12a initial energizing fluxes calculating sub-section
12b reference phase determining sub-section
12c non-reference phase comparing sub-section
21 system source-side breaker
22 load side breaker
23 transformer
24 surge absorber unit
25a low voltage side instrument transformer
25b system source-side instrument transformer

What is claimed is:

1. An transformer inrush current restraining control equipment, which controls a breaker closing timing that is installed between a three-phase transformer and a power system source-side and is connected to both of them, said equipment comprises:
a voltage measuring unit that measures three-phase voltages of said three-phase transformer and three-phase voltages of said system power system source-side;
a core-flux calculating unit that calculate fluxes in the three-phase transformer cores by integration of the three-phase voltages which have been measured by the said voltage measuring unit;
a true residual fluxes timing calculating unit that calculates the true residual fluxes timing by utilizing the three phase voltage values measured by said voltage measuring unit, and that is calculated as the timing when the three-phase transient voltages simultaneously converge to zero values or disappear at the end of the transient phenomenon just after said breaker tripping;
a true residual flux calculating unit that calculate the fluxes values in the three-phase cores of the transformer obtained as the flux values at the instant moment of the true residual fluxes timing, and memorize them as the true residual fluxes which have been calculated by said core-flux calculating unit;
a breaker closing phase angular timing calculating unit that calculate the appropriate phase angular timing of the breaker closing operation by utilizing the true residual fluxes values calculated by said true residual flux calculating unit; and
a breaker closing phase angular timing controlling unit that control the phase angular timing of the breaker closing by utilizing the three phase voltages that are measured by said voltage measuring unit and the breaker closing phase angular timing that have been calculated by said breaker closing phase angular timing calculating unit.

2. The transformer inrush current restraining control equipment, as claimed in claim 1, wherein:
said breaker closing phase angular timing calculating unit comprises:
a phasor value calculating section that calculates phasor values $\phi_r$ of a vector equilateral triangle of the true residual fluxes of said respective phases, which have been calculated by said true residual flux calculating unit by utilizing said effective residual fluxes ($\phi_a(\theta_{open1})$ $\phi_b(\theta_{open1})$, $\phi_c(\theta_{open1})$) and on a following equation (1):

$$\Phi_r = \sqrt{\{(2/3) \times (\{\phi_a(\theta_{open1})\}^2 + \{\phi_b(\theta_{open1})\}^2 + \{\phi_c(\theta_{open1})\}^2)\}} \qquad \text{Equation (1);}$$

and
a breaker closing phase angle determining section that calculates said breaker closing phase angle $\theta_{close}$ ($\theta_a$, $\theta_b$, $\theta_c$) by utilizing said true residual fluxes ($\phi_a$ ($\theta_{open1}$), $\phi_b(\theta_{open1})$, $\theta_c$ ($\theta_{open1}$)) which have been calculated by said true residual flux calculating unit, the phasor value $\phi_r$ which has been calculated by said phasor value calculating section, and a set of following equations (2):

$$\theta_a = \sin^{-1}(\phi_a(\theta_{open1})/\Phi_r)$$

$$\theta_b = \sin^{-1}(\phi_b(\theta_{open1})/\Phi_r)$$

$$\theta_c = \sin^{-1}(\phi_c(\theta_{open1})/\Phi_r) \qquad \text{a set of Equations (2).}$$

3. The transformer inrush current restraining control equipment, as claimed in claim 1, wherein:
said breaker closing phase angular timing $\theta_{close}$ is determined so that the individual phase polarities of the initial energized core fluxes ($\phi_a(\theta_{close})$, $\phi_b(\theta_{close})$, $\phi_c(\theta_{close})$) caused just after said breaker is closed and that of the phase angles of the true residual fluxes ($\phi_{ra}$, $\phi_{rb}$, $\phi_{rc}$) in the core of said transformer coincide with each other under ordinal system source-side voltages ($V_a(t)$, $V_b(t)$, $V_c(t)$), and further so that the absolute magnitude of the initial energized core flux of the first phase coincides with the absolute magnitude of the true residual flux of the same first phase, where the first phase is one arbitrary phase among the three phases.

4. The transformer inrush current restraining control equipment, as claimed in claim 1, wherein:
said breaker closing phase angle calculating unit comprises:
a breaker closing phase angle candidate calculating section that calculate two candidate values of phase angles as the candidates of the breaker closing phase angular timing; and
a breaker closing phase angle determining section that calculates phase angles that are deviated by $2\pi/3$ radians or −2π/3 radians from the two candidate values $\theta_\alpha$, $\theta_\beta$ of the breaker closing angular timing $\theta_{close}$, and calculate the predicted initial energizing flux values in the second and the third phase at the above phase deviated phase angles wherein the difference values between the above calculated predicted initial energizing flux values and the true residual fluxes in the second phase as well as in the third phase are compared for the two candidate values $\theta_\alpha$ and $\theta_\beta$, and If the difference in case of one of $\theta_\alpha$, $\theta_\beta$, are smaller than the difference in case of the another, the former candidate value is selected as said breaker closing phase angular timing $\theta_{close}$.

5. The transformer inrush current restraining control equipment, as claimed in claim 1, wherein:

said breaker closing phase angular timing calculating unit is provided with the parameter changing sub-section in that the phase angular timing as the parameter is changed in the angular range of between 0 degrees 360 degrees (0 [rad]~2π[rad]), the fluxes comparing sub-section in that the magnitude difference between the initial energized flux as with the changing parameter of the phase angular timing and the true residual flux of the same phase is calculated, said breaker closing phase angular timing determining sub-section in that the phase angle parameter at which the magnitude difference becomes the smallest is determined as said breaker closing phase angular timing.

6. The transformer inrush current restraining control equipment, as claimed in claim 3, wherein:

said breaker closing phase angle calculating unit comprises:

a breaker closing phase angle candidate calculating section that calculate two candidate values of phase angles as the candidates of the breaker closing phase angular timing; and a breaker closing phase angle determining section that calculates phase angles that are deviated by 2πc/3 radians or −2π/3 radians from the two candidate values $\theta_\alpha$, $\theta_\beta$ of the breaker closing angular timing $\theta_{close}$, and calculate the predicted initial energizing flux values in the second and the third phase at the above phase deviated phase angles wherein the difference values between the above calculated predicted initial energizing flux values and the true residual fluxes in the second phase as well as in the third phase are compared for the two candidate values $\theta_\alpha$ and $\theta_\beta$, and If the difference in case of one of $\theta_\alpha$, $\theta_\beta$, are smaller than the difference in case of the another, the former candidate value is selected as said breaker closing phase angular timing $\theta_{close}$.

7. The transformer inrush current restraining control equipment, as claimed in claim 3, wherein:

said breaker closing phase angular timing calculating unit is provided with the parameter changing sub-section in that the phase angular timing as the parameter is changed in the angular range of between 0 degrees 360 degrees (0[rad]~2π[rad]), the fluxes comparing sub-section in that the magnitude difference between the initial energized flux as with the changing parameter of the phase angular timing and the true residual flux of the same phase is calculated, said breaker closing phase angular timing determining sub-section in that the phase angle parameter at which the magnitude difference becomes the smallest is determined as said breaker closing phase angular timing.

\* \* \* \* \*